(12) United States Patent
Hino

(10) Patent No.: US 7,887,455 B2
(45) Date of Patent: Feb. 15, 2011

(54) BICYCLE HUB TRANSMISSION

(75) Inventor: Tetsuya Hino, Osaka (JP)

(73) Assignee: Shimano Inc., Osaka (JP)

( * ) Notice: Subject to any disclaimer, the term of this patent is extended or adjusted under 35 U.S.C. 154(b) by 561 days.

(21) Appl. No.: 12/103,096

(22) Filed: Apr. 15, 2008

(65) Prior Publication Data

US 2009/0036262 A1 Feb. 5, 2009

(30) Foreign Application Priority Data

Aug. 1, 2007 (EP) .................................. 07015124

(51) Int. Cl.
*F16H 3/62* (2006.01)
(52) U.S. Cl. ...................................... 475/275; 475/297
(58) Field of Classification Search .................. 475/271, 475/287, 297, 318, 324
See application file for complete search history.

(56) References Cited

U.S. PATENT DOCUMENTS

| 5,527,230 | A | 6/1996 | Meier-Burkamp |
|---|---|---|---|
| 6,048,287 | A | 4/2000 | Rohloff |
| 6,258,005 | B1 | 7/2001 | Rohloff |
| 6,533,700 | B2 | 3/2003 | Shoge |
| 6,572,508 | B2 | 6/2003 | Shoge |
| 6,607,465 | B1 | 8/2003 | Shoge |
| 6,641,500 | B2 | 11/2003 | Shoge |
| 6,852,060 | B1 * | 2/2005 | Ash .............................. 475/296 |
| 6,875,150 | B2 | 4/2005 | Matsuo et al. |
| 2004/0092357 | A1 * | 5/2004 | Biermann .................... 475/296 |
| 2005/0197230 | A1 | 9/2005 | Steuer et al. |
| 2008/0015079 | A1 * | 1/2008 | Gumpoltsberger .......... 475/271 |

FOREIGN PATENT DOCUMENTS

| DE | 43 42 347 C1 | 2/1995 |
|---|---|---|
| DE | 197 45 419 A1 | 4/1998 |
| DE | 197 20 796 A1 | 11/1998 |
| DE | 10 2004 011 052 A1 | 9/2005 |
| GB | 738338 | 10/1955 |
| WO | WO-01/92094 A1 | 12/2001 |

* cited by examiner

*Primary Examiner*—Edwin A. Young
(74) *Attorney, Agent, or Firm*—Global IP Counselors, LLP

(57) ABSTRACT

A bicycle hub transmission basically includes a hub axle, a driver, a hub shell, a power transmission mechanism and a shift mechanism. The driver is rotatably supported relative to the hub axle. The hub shell is rotatably supported relative to the driver. The power transmission mechanism includes a downstream planetary gear unit and an upstream planetary gear unit disposed between the driver and the hub shell to selectively transmit rotational power from the driver to the hub shell through one a plurality of power transmission paths. The shift mechanism is operatively coupled to the power transmission mechanism to select one of the power transmission paths. The downstream planetary gear unit includes at least a first sun gear, a second sun gear and a planetary gear carrier that meshes with planetary gears of the upstream planetary gear unit.

19 Claims, 16 Drawing Sheets

BICYCLE HUB TRANSMISSION

CROSS-REFERENCE TO RELATED APPLICATIONS

This application claims priority under 35 U.S.C. §119 to European Patent Application No. 07015124.6 filed Aug. 1, 2007. The entire disclosure of European Patent Application No. 07015124.6 is hereby incorporated herein by reference.

BACKGROUND OF THE INVENTION

1. Field of the Invention

The present invention generally relates to a hub transmission for a bicycle. More specifically, the present invention relates to an internally geared bicycle hub transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Internally mounted multi-speed hub transmissions are mounted to the rear wheel of a bicycle and allow a rider of the bicycle to select different gear ratios to change the pedaling force. Typically a hub transmission has a hub axle that is mounted to the bicycle frame. The hub axle rotatably supports a driver for transmitting a pedaling force to the hub transmission through a sprocket and a chain. The hub transmission further comprises a hub shell which is likewise rotatably supported by the hub axle.

The hub shell accommodates a power transmission mechanism which is disposed between the driver and the hub shell for transmitting rotational power from the driver to the hub shell. The power transmission mechanism provides a plurality of power transmission paths with different gear ratios that can be selected by using a shift mechanism, wherein each power transmission path typically produces a specific gear ratio. To establish the plurality of power transmission paths the power transmission mechanism ordinarily has several planetary gear mechanisms.

Current internal hub transmissions are designed to provide 10 or more speed stages. For example, one proposed internal hub transmission is disclosed in German Patent Publication No. DE 10 2004 011 052 A1. The hub transmission according to German Patent Publication No. DE 10 2004 011 052 A1 allows a selection between 9 speed stages which are provided by a plurality of planetary gear mechanisms. The known hub transmission has three planetary gear mechanisms that allow the combination of three speed stages with another five speed stages, for a total of nine speed stages with a gear ratio of 340%. The hub transmission includes a first planetary gear mechanism having a first sun gear that is non-rotatably mounted to the hub axle, a first planetary gear rotatably supported by a first planetary gear carrier and a first ring gear. The first planetary gears are disposed between the first sun gear and the first ring gear and mesh with the same.

A second planetary gear mechanism includes a second sun gear which is arranged on the first planetary gear carrier. Second planetary gears are mounted on the first ring gear. A third planetary gear mechanism is formed similar to the second planetary gear mechanism, and includes a third sun gear mounted on the first planetary gear carrier. The third sun gear meshes with third planetary gears with each being non-rotatably joined to the respective second planetary gears. Thereby a two-step planetary gear is formed. The third planetary gears mesh with a second ring gear to transmit the torque of the third planetary gear mechanism to the second planetary gear mechanism.

The shifting mechanism of this hub transmission comprises a pawl carrier which allows coupling the driver selectively with components of the respective planetary gear mechanisms to produce different gear ratios. To this end the pawl carrier comprises a plurality of controllable pawls, namely six pawls that are actuated by means of three shifting cams.

The arrangement of the two-step planetary gear on the first ring gear in combination with the second ring gear that meshes with the two-step planetary gears, leads to a pile type of internal hub transmission. Since the second ring gear overlaps the other components of the three planetary gear mechanisms, the diameter of the second ring gear and, thus, the diameter of the internal hub transmission is increased. Moreover, the pile type construction of the internal hub transmission leads to an increased total weight of the hub.

As described above, the second and third sun gears are each mounted on the first planetary gear carrier. Therefore, the second and third sun gears each rotate together with the first planetary gear carrier around the hub axle. In particular, the power transmission path for speed stages 8 and 9 comprises the driver, the sixth pawl and the first planetary gear carrier wherein the first planetary gears rotate around the first sun gear. The power transmission path further has the first ring gear, the second ring gear, the first pawl, the pawl connecting the power transmission with the hub shell and the hub shell. In speed stage 8, the third planetary gear rotates around the third sun gear and in speed stage 9 the second planetary gear rotates around the second sun gear.

Due to this differential rotational type of the planetary gear mechanism the power transmission paths are complicated. In particular the power transmission paths for speed stages 8 and 9 inefficiently transmit power.

A similar hub transmission is known from German Patent Publication No. DE 197 20 796 A1, which discloses a multiple speed hub having a plurality of planetary gear mechanisms arranged in series. The hub transmission disclosed therein enables either a 7 speed shifting or a 14 speed shifting. The 14 speed hub transmission comprises five planetary gear mechanisms, the components of which can be selectively locked to establish the desired power transmission paths. A first planetary gear mechanism comprises a first sun gear rotatably supported by a hub axle which can be locked with the same. The first sun gear meshes with the smaller diameter of a two-step planetary gear which is rotatably supported by a first planetary gear carrier. The first planetary gear carrier is non-rotatably connected with the hub shell. The large diameter of the two-step planetary gear meshes with a ring gear that can be locked either with the hub axle or the first sun gear. A second planetary gear mechanism comprises a second sun gear rotatably supported by and lockable with the hub axle. Second planetary gears mesh with the sun gear and a second ring gear wherein the second ring gear is non-rotatably connected with the first sun gear. A third planetary gear mechanism comprises a third sun gear which is rotatably supported by and lockable with the hub axle. Third planetary gears mesh with the third sun gears which are non-rotatably connected with the second planetary gears with the respective second planetary gears. The second sun gear meshes with the small diameter stage of the stepped planetary gears, and the third sun gear meshes with the large diameter stage of the stepped planetary gears.

The fourth and fifth planetary gear mechanisms are similar to the second and third planetary gear mechanisms and are symmetrically formed and arranged. The fourth and fifth planetary gear mechanisms therefore likewise comprise two-stage planetary gears, wherein the planetary gears of the second and third planetary gear mechanism and the planetary gears of the fourth and fifth planetary gear mechanisms are rotatably supported by means of a common planetary gear carrier. The small diameter stage of the stepped planetary gears of the fourth and fifth planetary gear mechanisms mesh with a ring gear that is non-rotatably connected with a driver.

A further embodiment of the 14-speed hub transmission is based on a modified embodiment of the above described hub transmission, and has a second ring gear which meshes with both small diameter stages of the symmetrically arranged stepped planetary gears. The common planetary gear carrier is replaced with two separate planetary gear carriers with the planetary gear carrier of the second and third planetary gear mechanisms being non-rotatably connected with the first sun gear. The planetary gear carrier of the fourth and fifth planetary gear mechanisms is non-rotatably connected with the driver.

Owing to the increased number of clutches required for locking the separate components of the planetary gear mechanisms, for example the ring gears with the sun gears, the hub transmission according to German Patent Publication No. DE 197 20 796 A1 is complicated and comparatively expensive.

In view of the above, it will be apparent to those skilled in the art from this disclosure that there exists a need for an improved bicycle hub transmission. This invention addresses this need in the art as well as other needs, which will become apparent to those skilled in the art from this disclosure.

SUMMARY OF THE INVENTION

One object of the invention to provide a hub transmission for a bicycle comprising a plurality of speed stages and enabling a lightweight and compact construction.

The foregoing object can basically be attained by providing a bicycle hub transmission that basically comprises a hub axle, a driver, a hub shell, a power transmission mechanism and a shift mechanism. The driver is rotatably supported relative to the hub axle. The hub shell is rotatably supported relative to the driver. The power transmission mechanism includes a downstream planetary gear unit and an upstream planetary gear unit disposed between the driver and the hub shell to selectively transmit rotational power from the driver to the hub shell through one a plurality of power transmission paths. The shift mechanism is operatively coupled to the power transmission mechanism to select one of the power transmission paths. The downstream planetary gear unit includes at least a first sun gear, a second sun gear and a planetary gear carrier that meshes with planetary gears of the upstream planetary gear unit.

A hub transmission formed in accordance with the illustrated embodiment has a number of advantages. Since the planetary gear carrier of the downstream planetary gear unit meshes with planetary gears of the upstream planetary gear unit a compact design is achieved that allows the realization of a plurality of power transmission paths while maintaining a small diameter of the hub. The aforementioned coupling of the downstream planetary gear carrier with upstream planetary gears further allows for a plurality of power transmission paths by using a comparatively simple structure that reduces the risk of failure of components in the transmission.

Owing to the surprisingly simple structure of the inventive hub transmission, it is possible to produce a hub transmission that enables a comparatively great number of gear ratios at relatively low costs. Since the downstream planetary gear unit comprises more than one sun gear, the hub transmission according to the illustrated embodiment allows the implementation of 15 speed stages.

In a preferred embodiment, the power transmission mechanism has the downstream planetary gear unit and the upstream planetary gear unit arranged to form at least five planetary gear mechanisms arranged in series. Thereby it is possible to realize a 15-speed hub transmission with a compact design and a relatively small hub diameter.

Preferably, the downstream planetary gear unit constitutes at least first and second planetary gear mechanisms and the upstream planetary gear unit constitutes at least third, fourth and fifth planetary gear mechanisms.

Preferably, the first and second planetary gear mechanisms include the planetary gear carrier of the downstream planetary gear unit as a common carrier and the fourth gear mechanism includes the planetary gears of the upstream planetary gear unit. This means that the first and second planetary gear mechanisms are coupled with the fourth planetary gear mechanism by means of the planetary gear carrier of the downstream planetary gear unit which meshes with the upstream planetary gears.

Preferably, the planetary gear carrier of the downstream planetary gear unit includes a carrier portion and a ring gear portion which meshes with the planetary gears of the upstream planetary gear unit, with the carrier portion and the ring gear portion being non-rotatably connected as a unit. Hence, it is to be emphasized that the planetary gear carrier of the downstream planetary gear unit fulfils two functions, namely a support function for the planetary gears of the first and second planetary gear mechanisms and a power transmission function for the planetary gears of the upstream planetary gear unit. Owing to the non-rotatable connection between the carrier portion and the ring gear portion, the compact design of the hub transmission is optimized.

Preferably, the planetary gear carrier of the downstream planetary gear unit is selectively connectable with the fifth planetary gear mechanism. Thereby, a number of further power transmission paths can be realized.

The connection of the planetary gear carrier and the downstream planetary gear unit with the fifth planetary gear mechanism can be realized, for example, by means of a preferred embodiment wherein the planetary gear carrier of the downstream planetary gear unit includes a clutch engaging portion which is selectively connectable with a planetary gear carrier of the fifth planetary gear mechanism.

To enable transmission of a rotational force from the planetary gear carrier of the downstream planetary gear unit to the hub shell, the planetary gear carrier of the downstream planetary gear unit is selectively connectable with the hub shell by a first clutch to transmit a rotational force from the planetary gear carrier to the hub shell.

In a preferred embodiment, the first planetary gear mechanism includes the first sun gear and a plurality of first planetary gears, with the first sun gear being rotatably supported by the hub axle and selectively lockable with the hub axle, and the first planetary gears being rotatably supported by the planetary gear carrier of the downstream planetary gear unit and meshing with the first sun gear. The first planetary gear mechanism is part of the downstream planetary gear unit.

Preferably, the second planetary gear mechanism includes the second sun gear, a first ring gear and a plurality of second planetary gears, with the second sun gear being rotatably supported by the hub axle and selectively lockable with the hub axle, the first ring gear being rotatably supported by the planetary gear carrier of the downstream planetary gear unit and being coaxially arranged with the second sun gear, and the second planetary gears meshing with the second sun gear and the first ring gear, the second planetary gears and the first and second planetary gears being non-rotatably connected as a unit to form stepped planetary gears respectively. The second planetary gear mechanism is also part of the downstream planetary gear unit.

Thus, the downstream planetary mechanism comprises more than one sun gear, namely the first and second sun gears. The first and second sun gears of the downstream planetary gear unit (in general: the more than one sun gear) mesh with the planetary gears of the first and second planetary gear mechanisms and interact with the (common) planetary gear carrier of the downstream planetary gear unit.

Preferably, the first ring gear is selectively connectable with the hub shell by a second clutch for transmitting a rotational force from the first ring gear to the hub shell.

Preferably, the third planetary gear mechanism includes a third sun gear, a second planetary gear carrier and a plurality of third planetary gears, with the third sun gear being rotatably supported by the hub axle and selectively lockable with the hub axle, the second planetary gear carrier being rotatably supported relative to the hub axle and the third planetary gears rotatably being supported by the second planetary gear carrier and meshing with the third sun gear.

Preferably, the fourth planetary gear mechanism includes a fourth sun gear rotatably supported by the hub axle and selectively lockable with the hub axle, with the planetary gears of the fourth planetary gear mechanism being rotatably supported by the second planetary gear carrier and meshing with the fourth sun gear.

Preferably, the planetary gears of the fourth planetary gear mechanism and the third planetary gears of the third planetary gear mechanism are non-rotatably connected as a unit to form stepped planetary gears respectively.

In a further preferred embodiment, the fifth planetary gear mechanism includes a fifth sun gear, a second ring gear and a plurality of fifth planetary gears, with the fifth sun gear being non-rotatably fixed to the hub axle, the second ring gear being coaxially arranged with the fifth sun gear, and the fifth planetary gears being rotatably supported by a third planetary gear carrier and meshing with the fifth sun gear and the second ring gear.

Preferably, the third planetary gear carrier engages with the second planetary gear carrier.

Preferably, a third clutch disposed between the third planetary gear carrier and the first planetary gear carrier, with a clutch engaging portion arranged to selectively transmit a rotational force from the third planetary gear carrier to the first planetary gear carrier. A fourth clutch can be disposed between the driver and the second ring gear to selectively transmit a rotational force from the driver to the second ring gear. A fifth clutch may be disposed between the driver and the third planetary gear carrier to selectively transmit a rotational force from the driver to the third planetary gear carrier.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
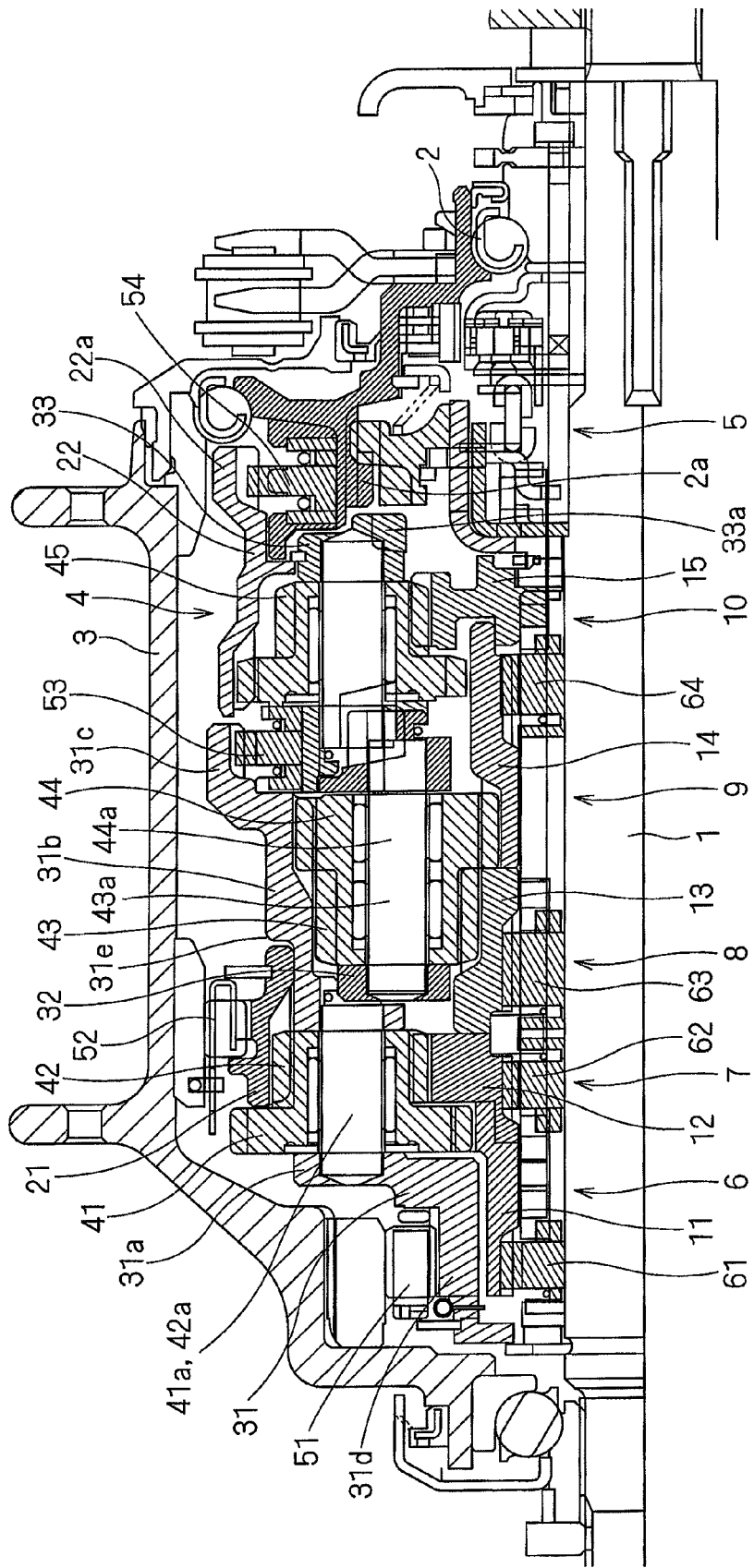
FIG. 1 is a longitudinal cross-sectional view of a hub transmission according to an illustrated embodiment.
Figure 2:
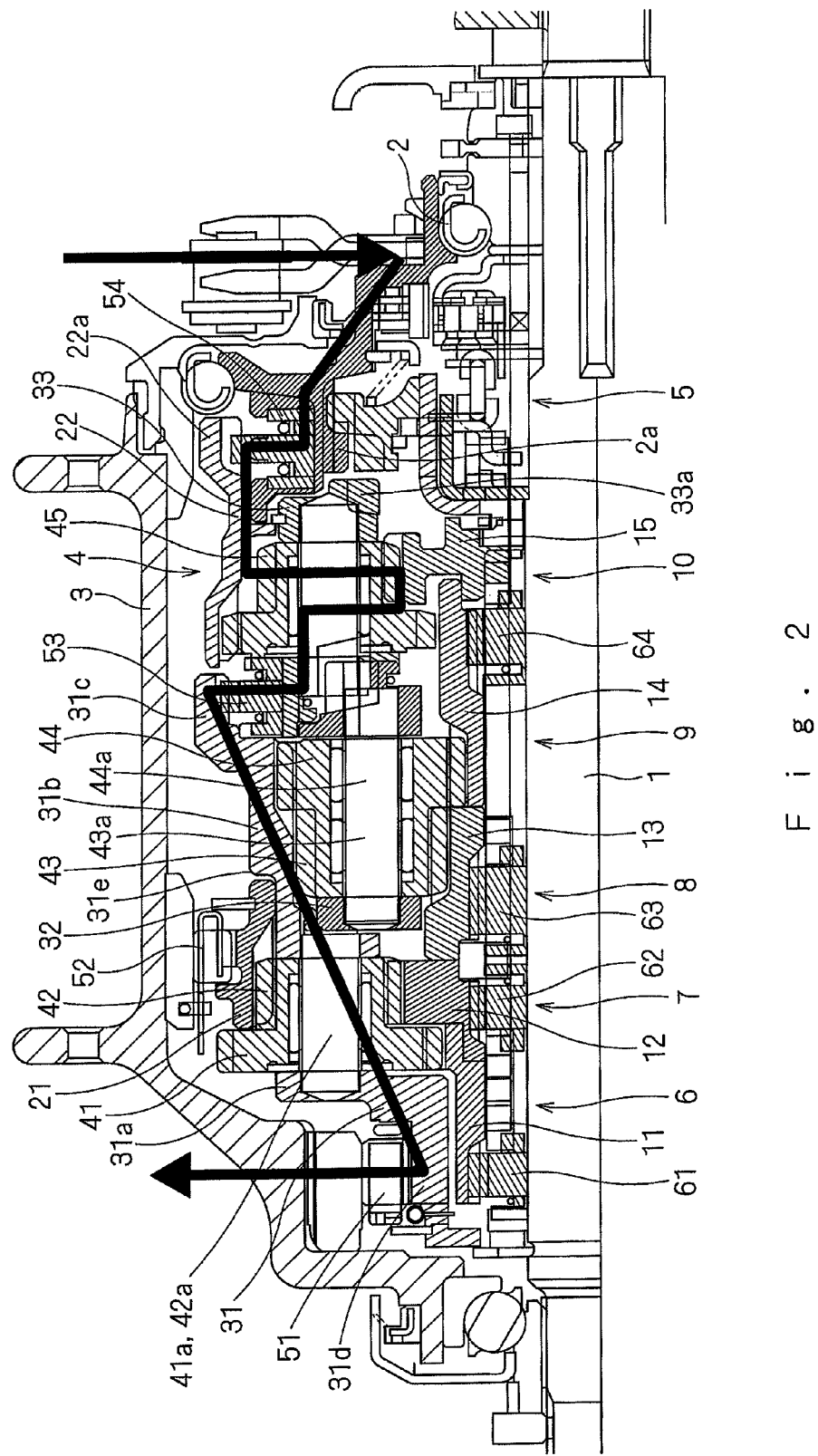
FIG. 2 is a longitudinal cross-sectional view of the hub transmission according to FIG. 1 in speed stage 1.
Figure 3:
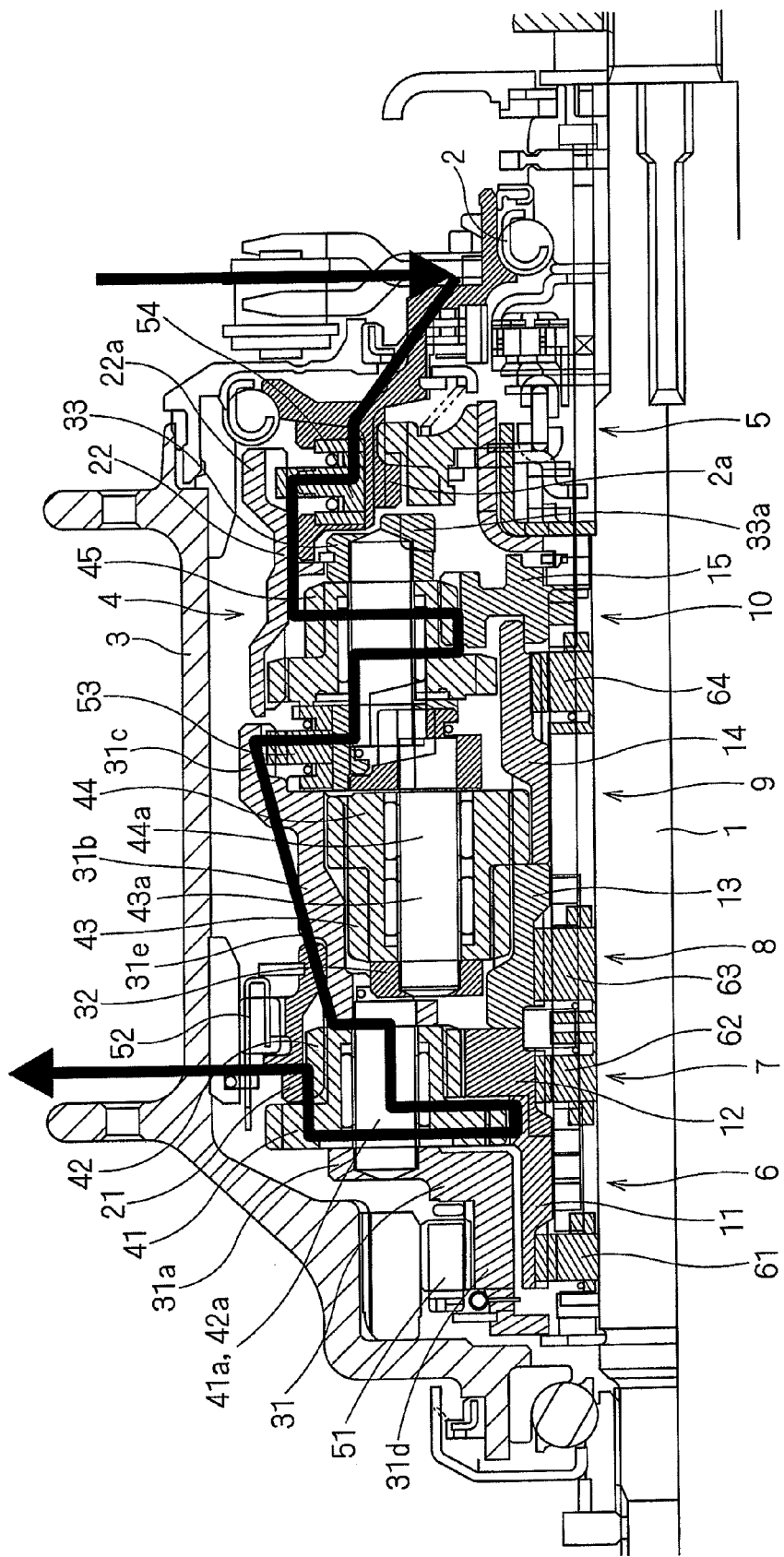
FIG. 3 is a longitudinal cross-sectional view of the hub transmission according to FIG. 1 in speed stage 2.
Figure 4:
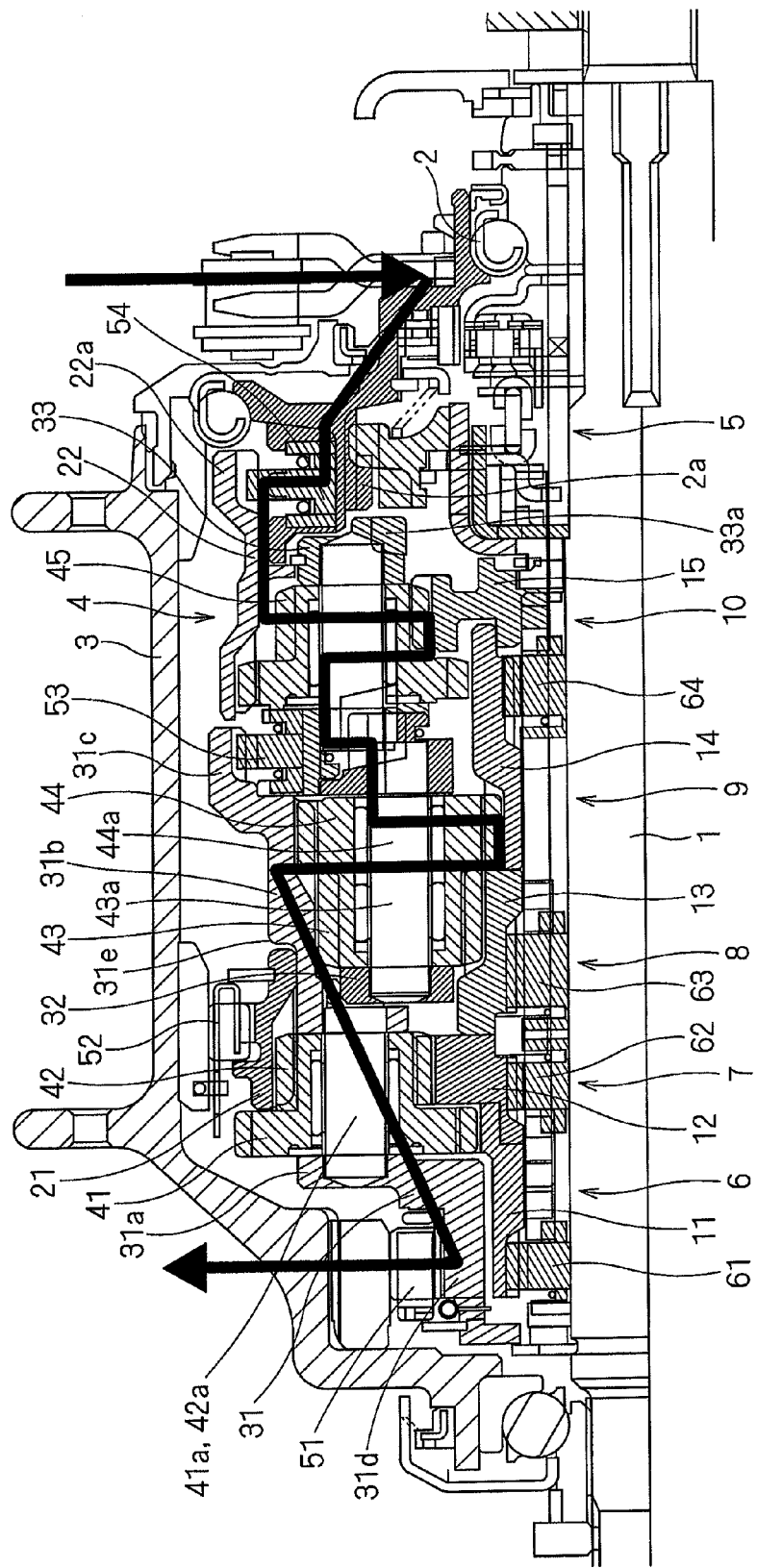
FIG. 4 is a longitudinal cross-sectional view of the hub transmission according to FIG. 1 in speed stage 3.
Figure 5:
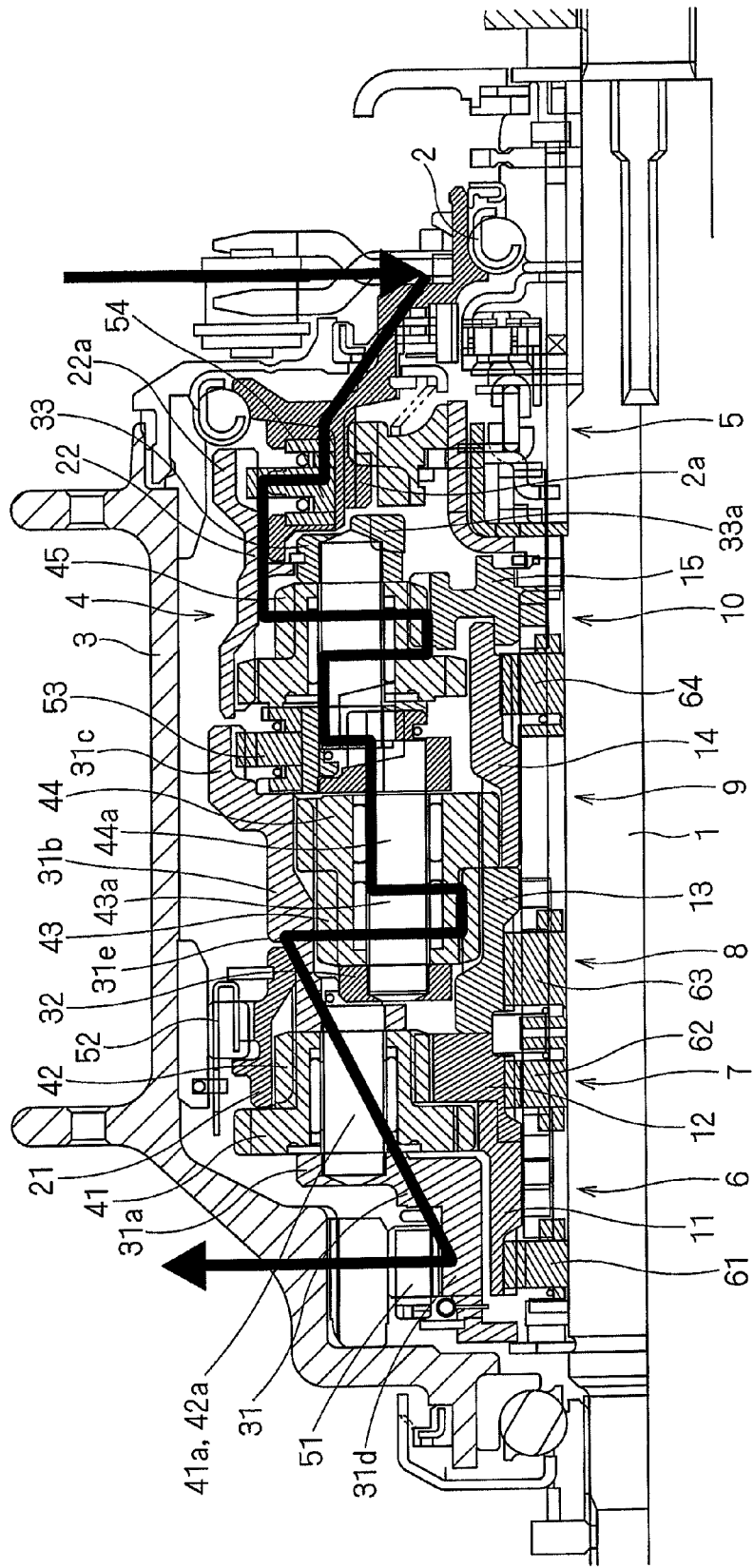
FIG. 5 is a longitudinal cross-sectional view of the hub transmission according to FIG. 1 in speed stage 4.
Figure 6:
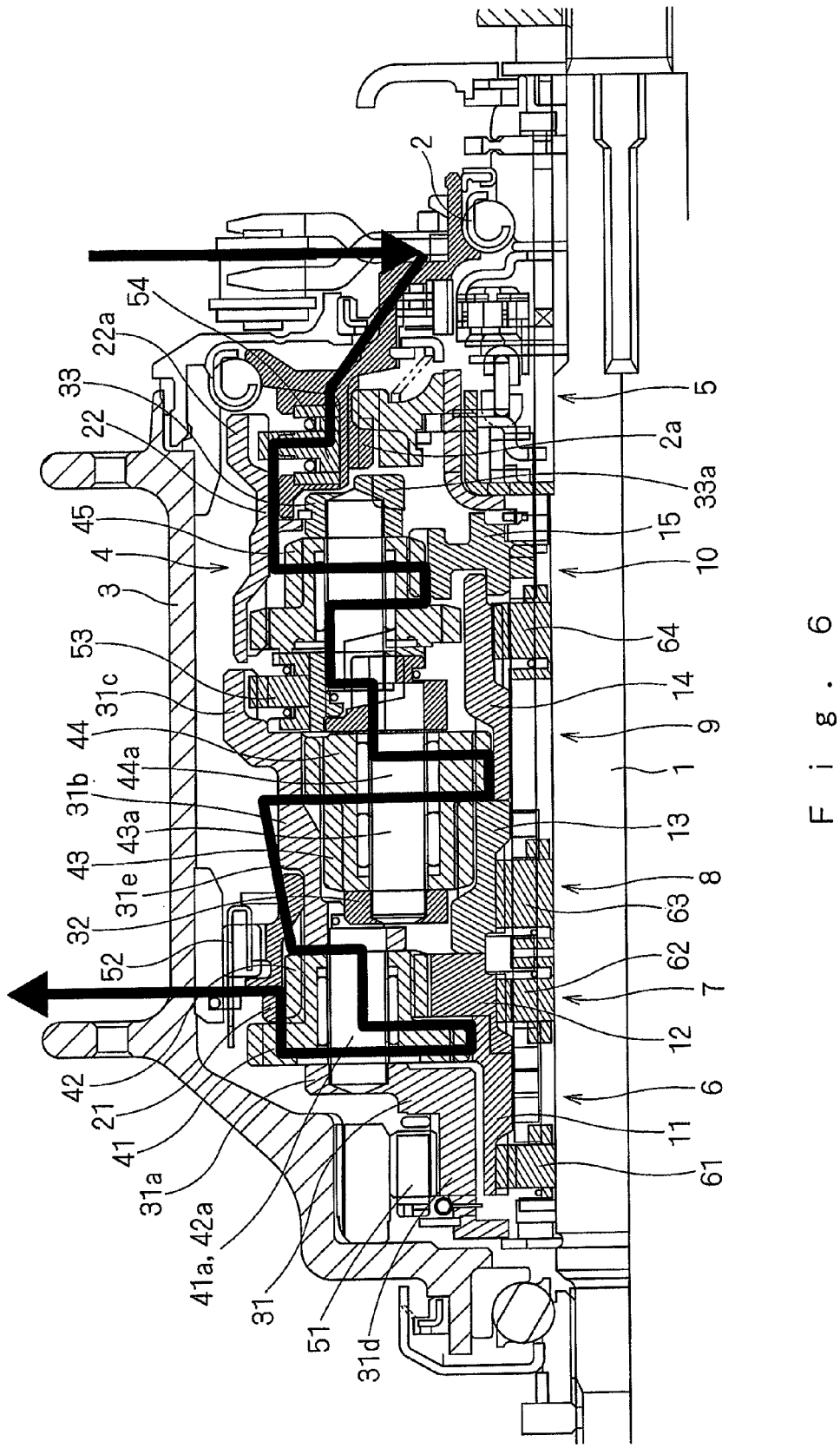
FIG. 6 is a longitudinal cross-sectional view of the hub transmission according to FIG. 1 in speed stage 5.
Figure 7:
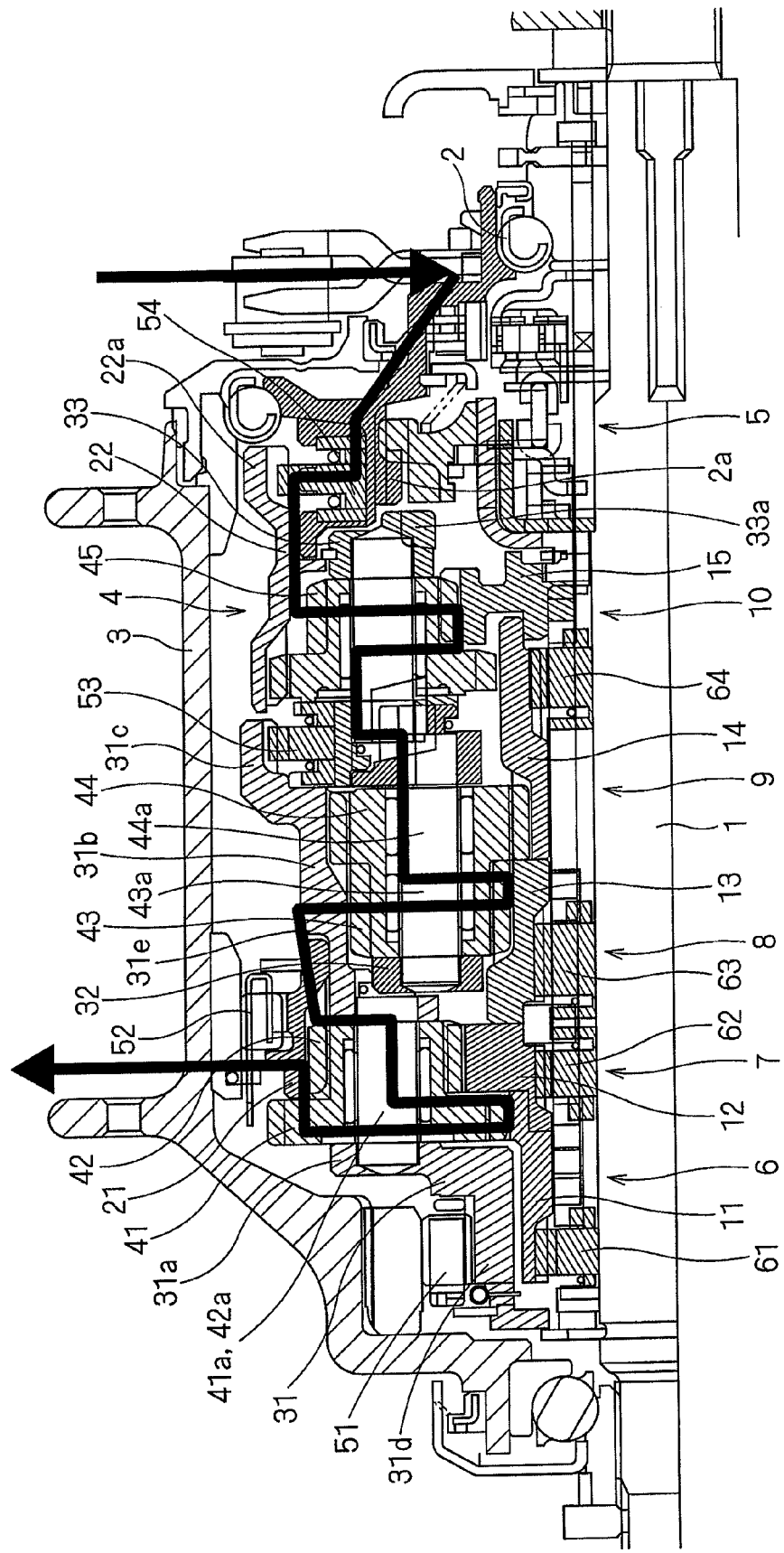
FIG. 7 is a longitudinal cross-sectional view of the hub transmission according to FIG. 1 in speed stage 6.
Figure 8:
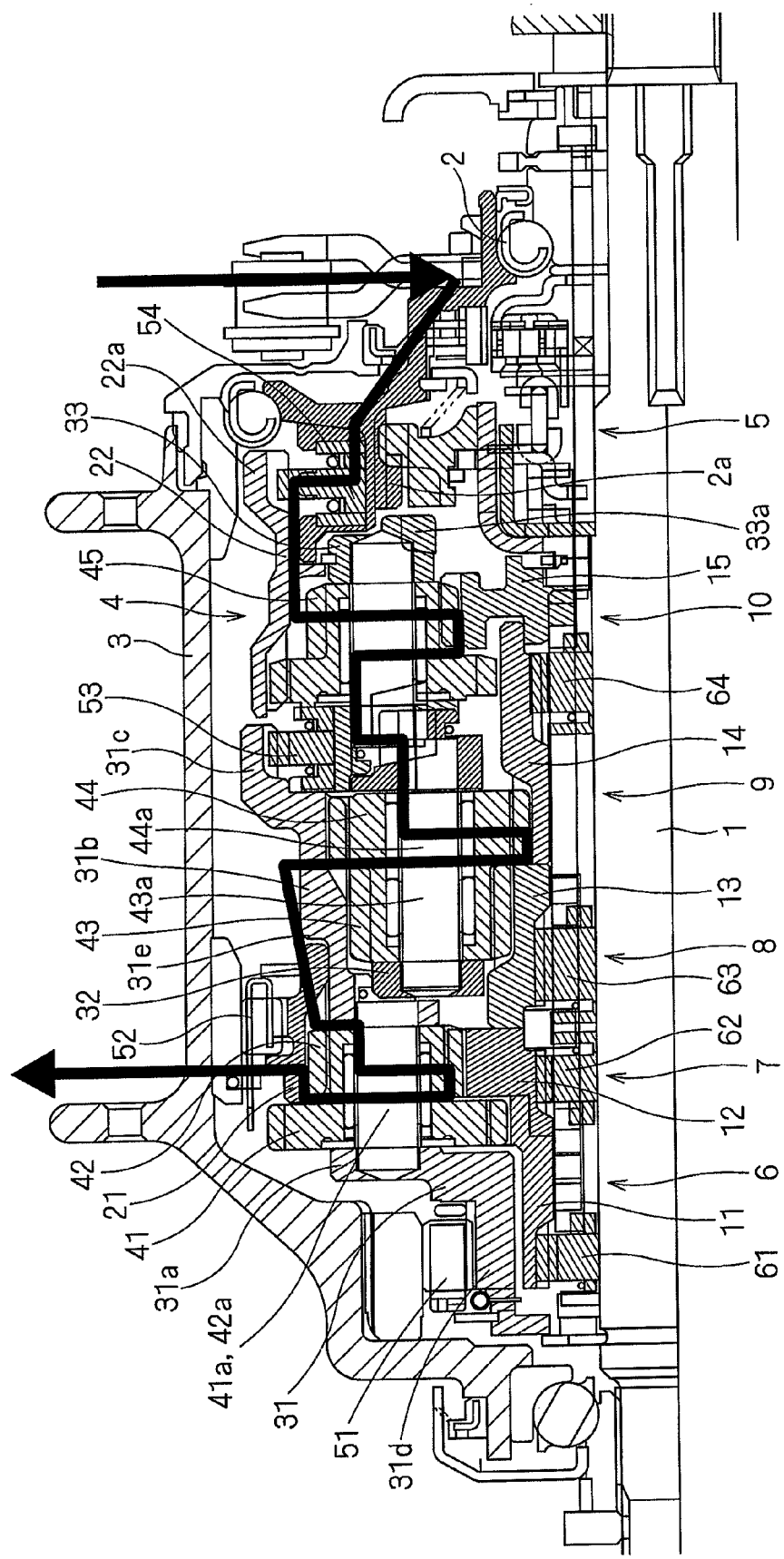
FIG. 8 is a longitudinal cross-sectional view of the hub transmission according to FIG. 1 in speed stage 7.
Figure 9:
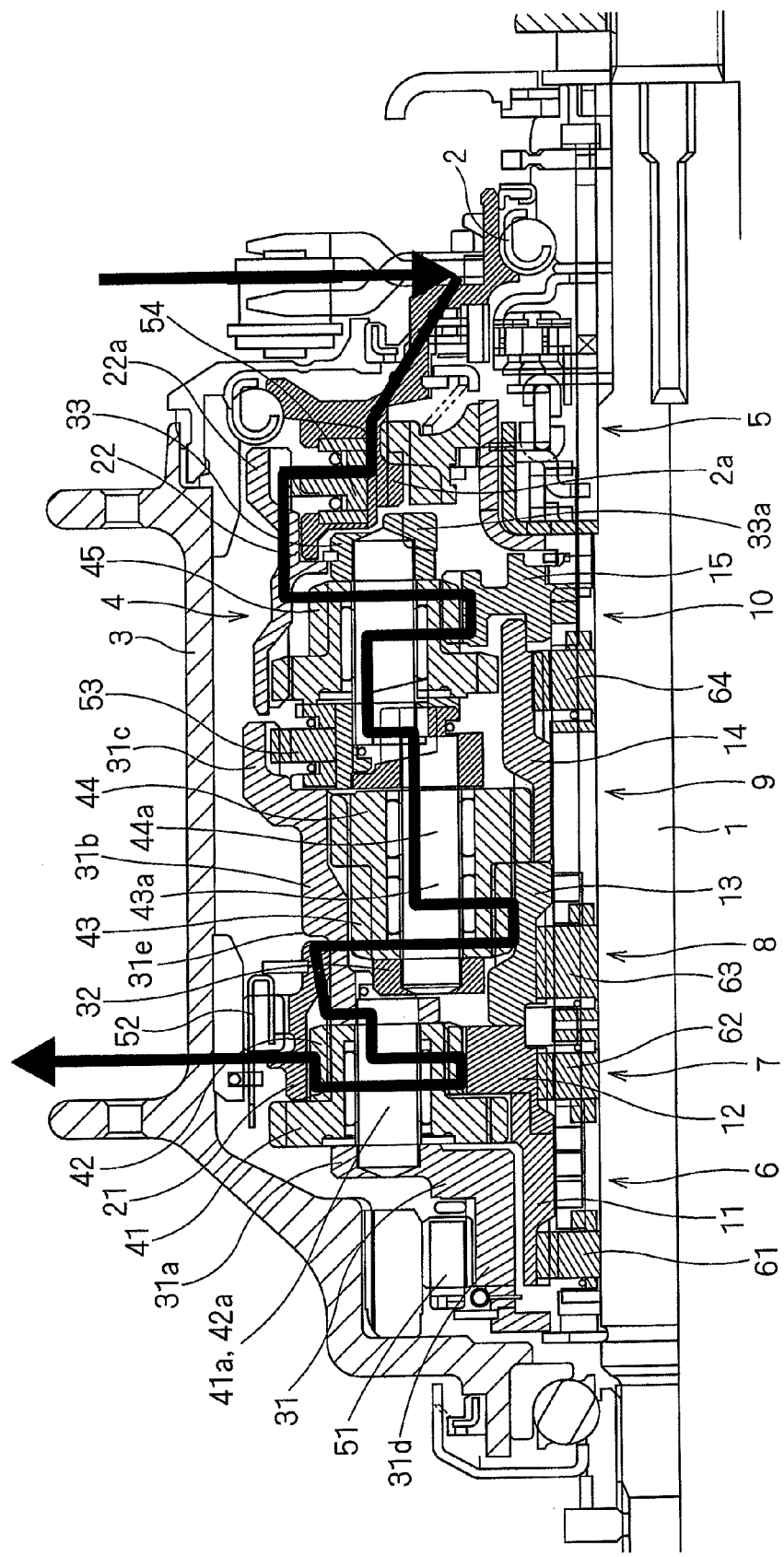
FIG. 9 is a longitudinal cross-sectional view of the hub transmission according to FIG. 1 in speed stage 8.
Figure 10:
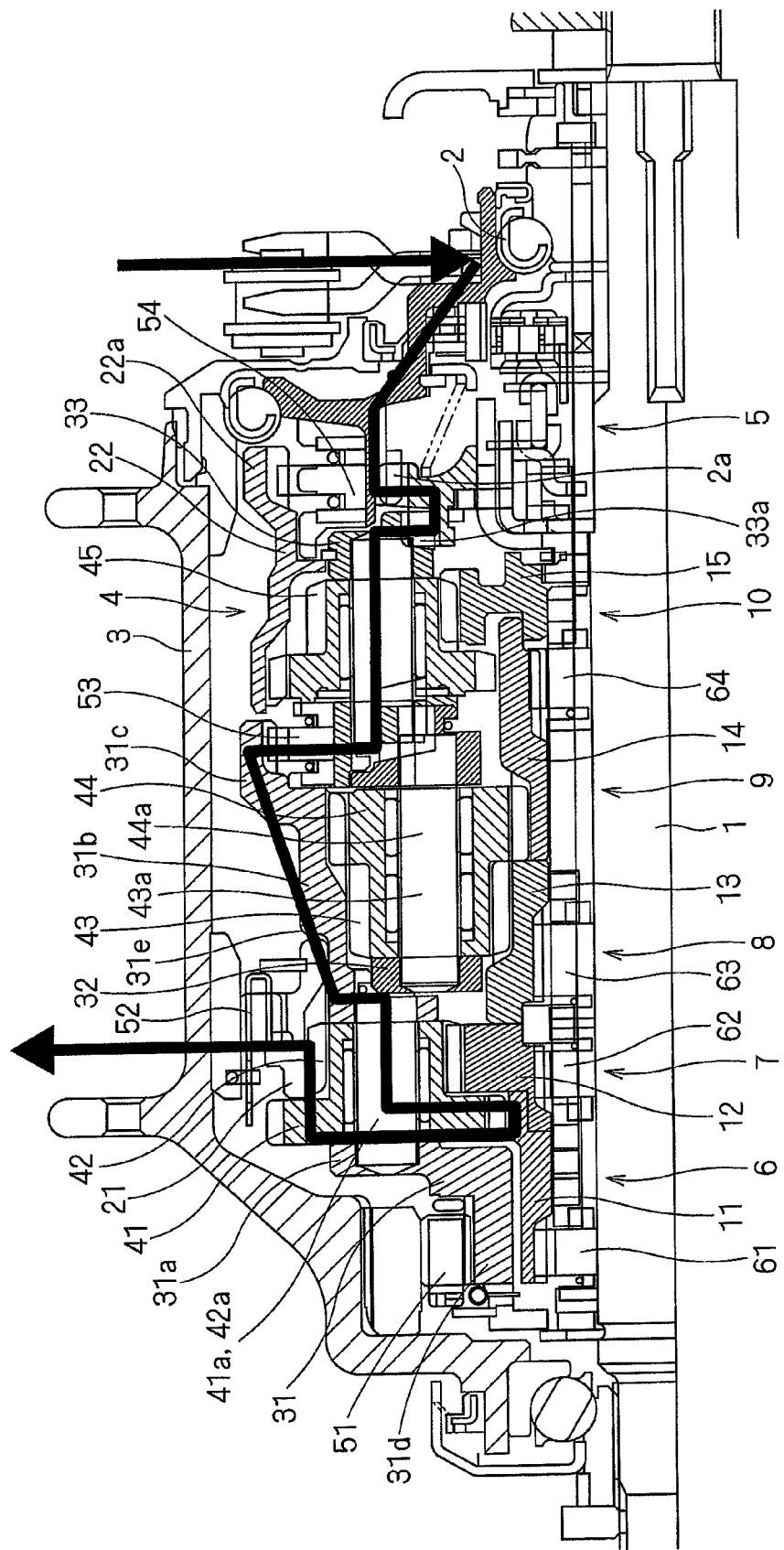
FIG. 10 is a longitudinal cross-sectional view of the hub transmission according to FIG. 1 in speed stage 9.
Figure 11:
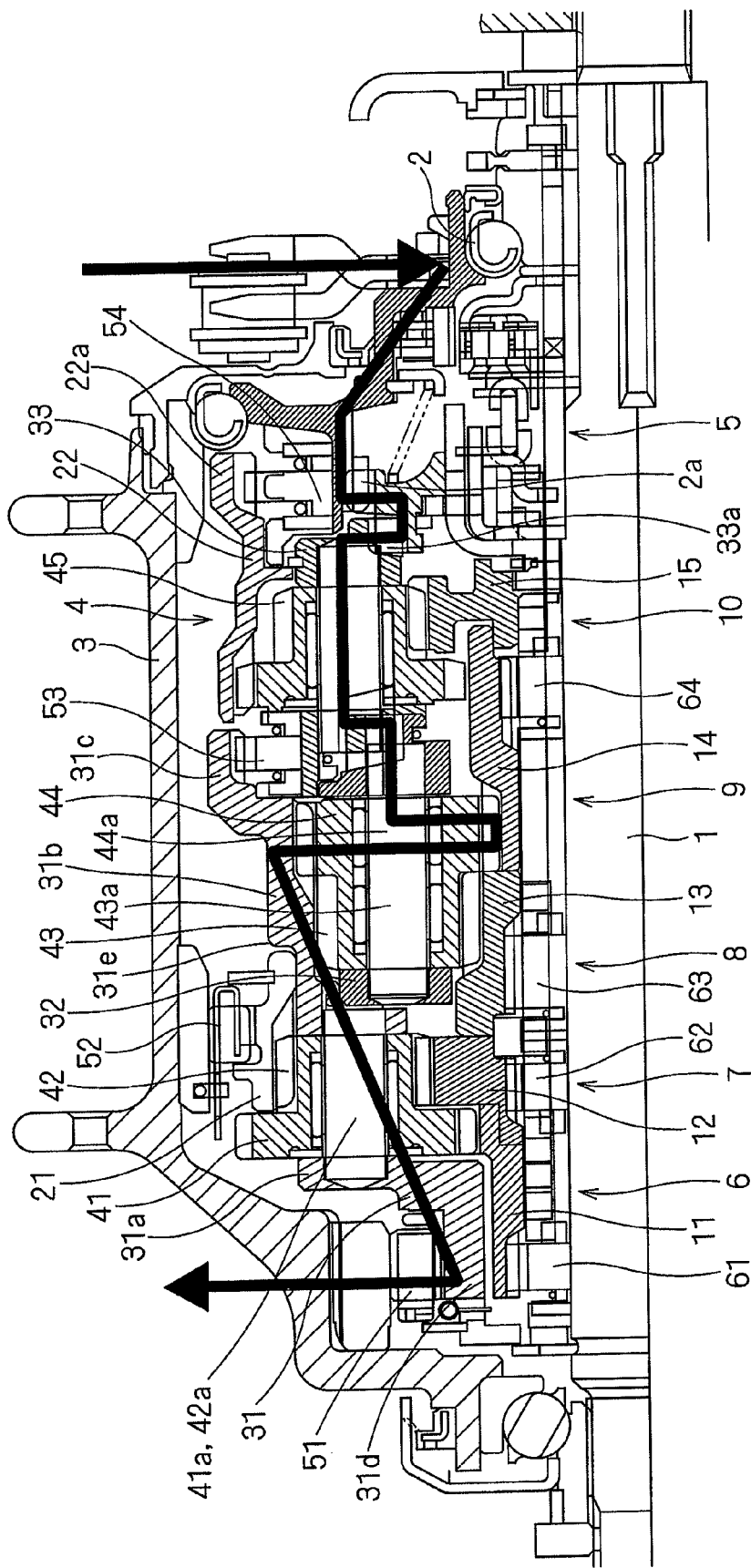
FIG. 11 is a longitudinal cross-sectional view of the hub transmission according to FIG. 1 in speed stage 10.
Figure 12:
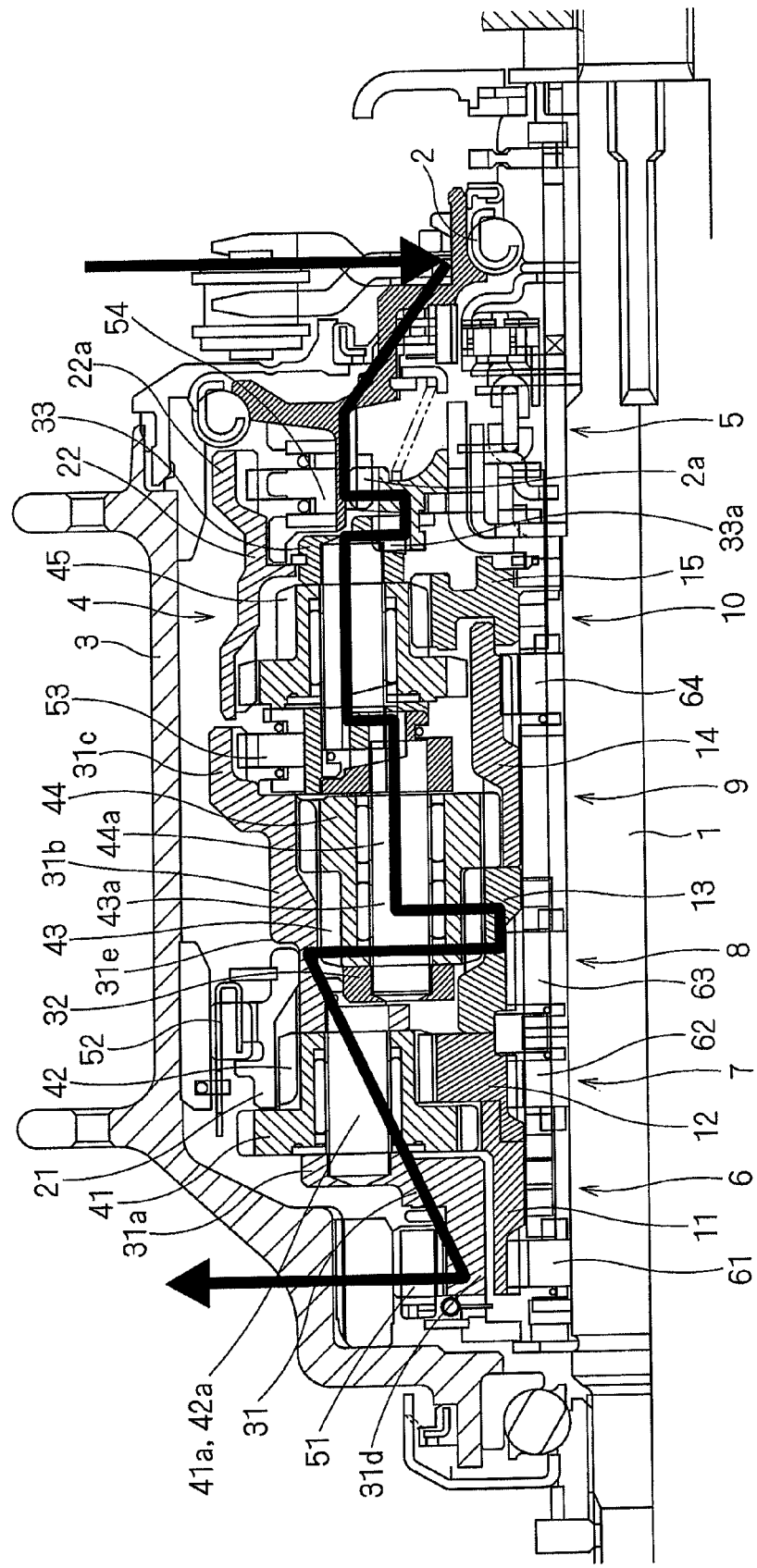
FIG. 12 is a longitudinal cross-sectional view of the hub transmission according to FIG. 1 in speed stage 11.
Figure 13:
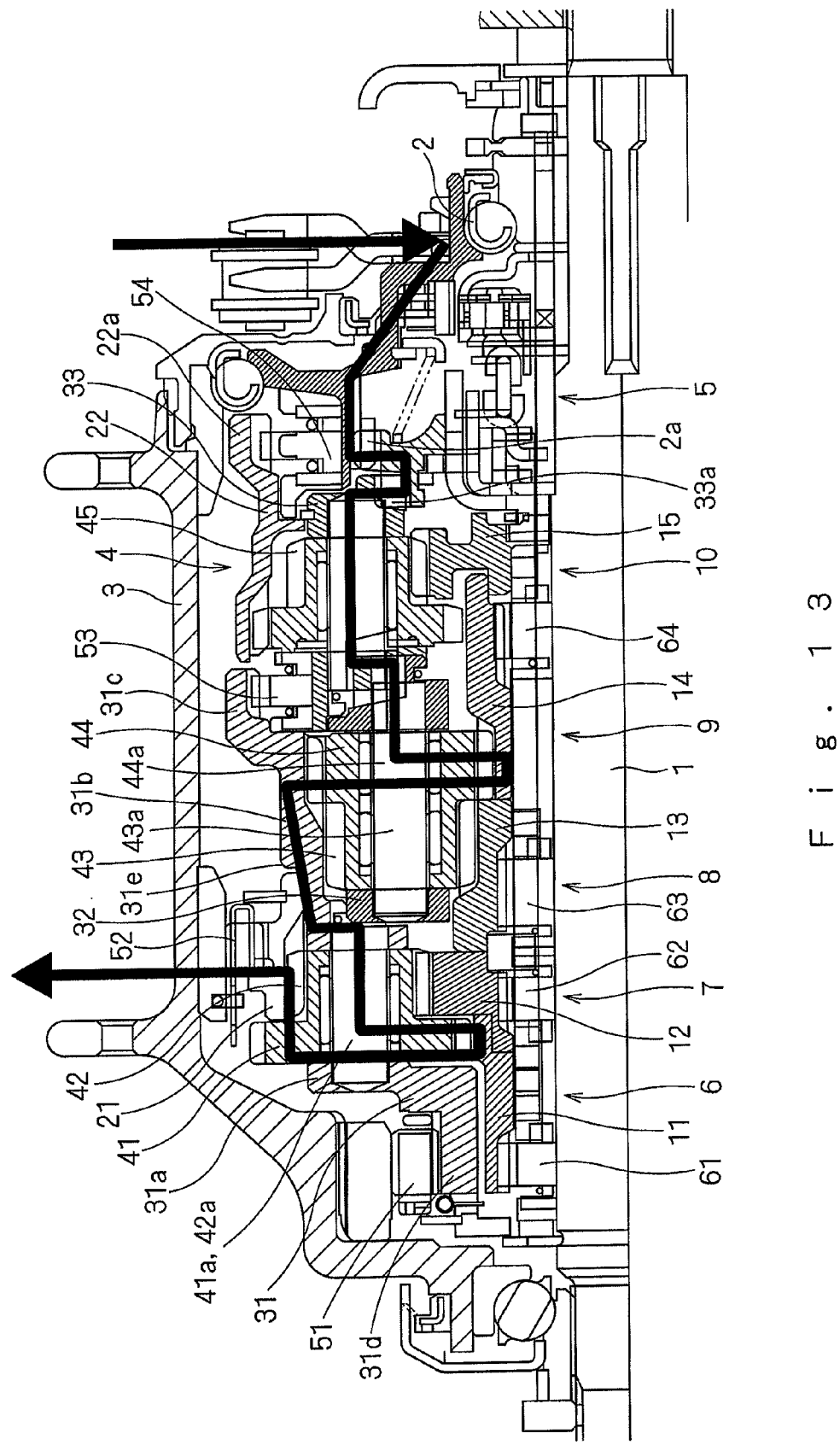
FIG. 13 is a longitudinal cross-sectional view of the hub transmission according to FIG. 1 in speed stage 12.
Figure 14:
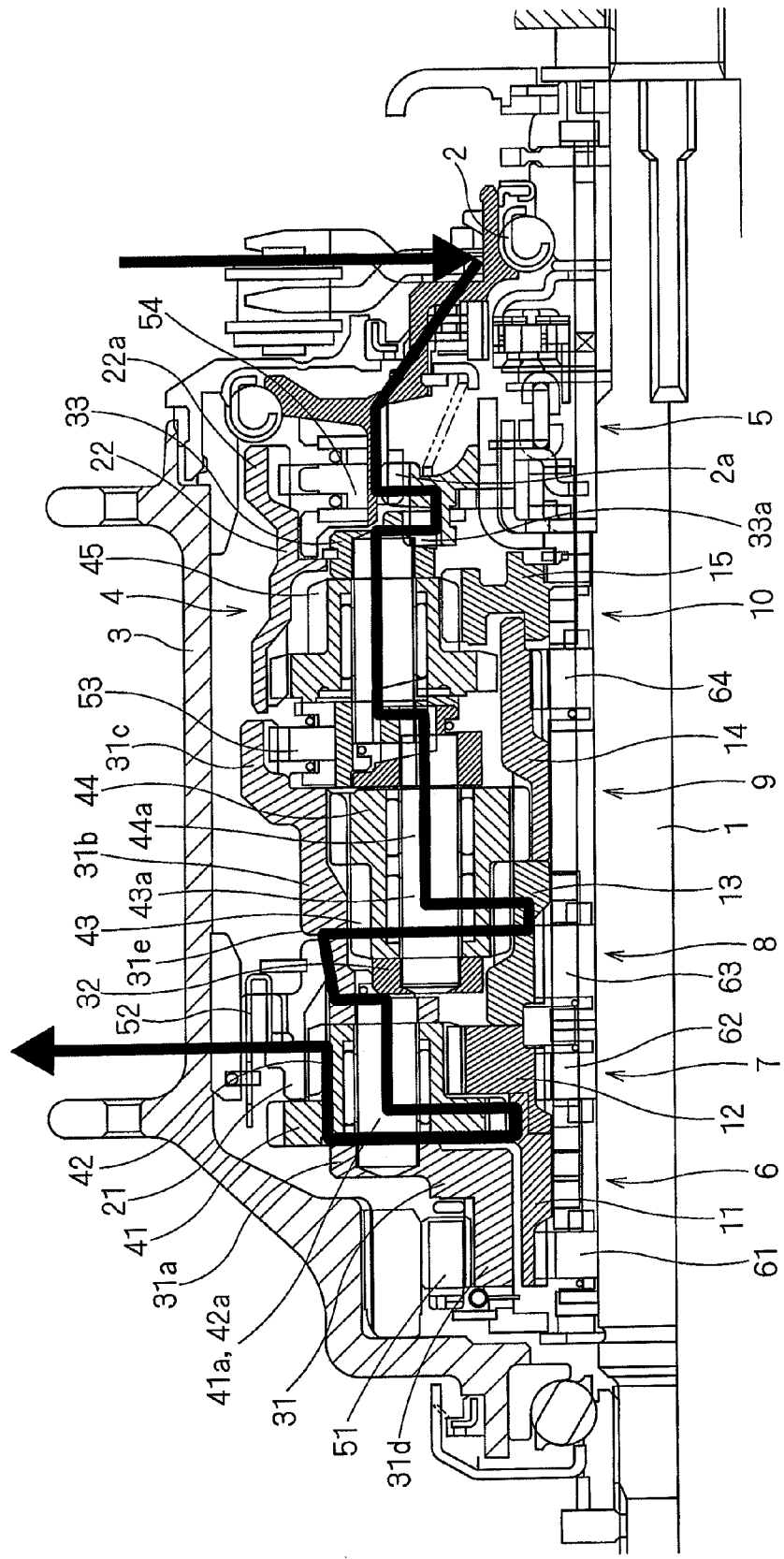
FIG. 14 is a longitudinal cross-sectional view of the hub transmission according to FIG. 1 in speed stage 13.
Figure 15:
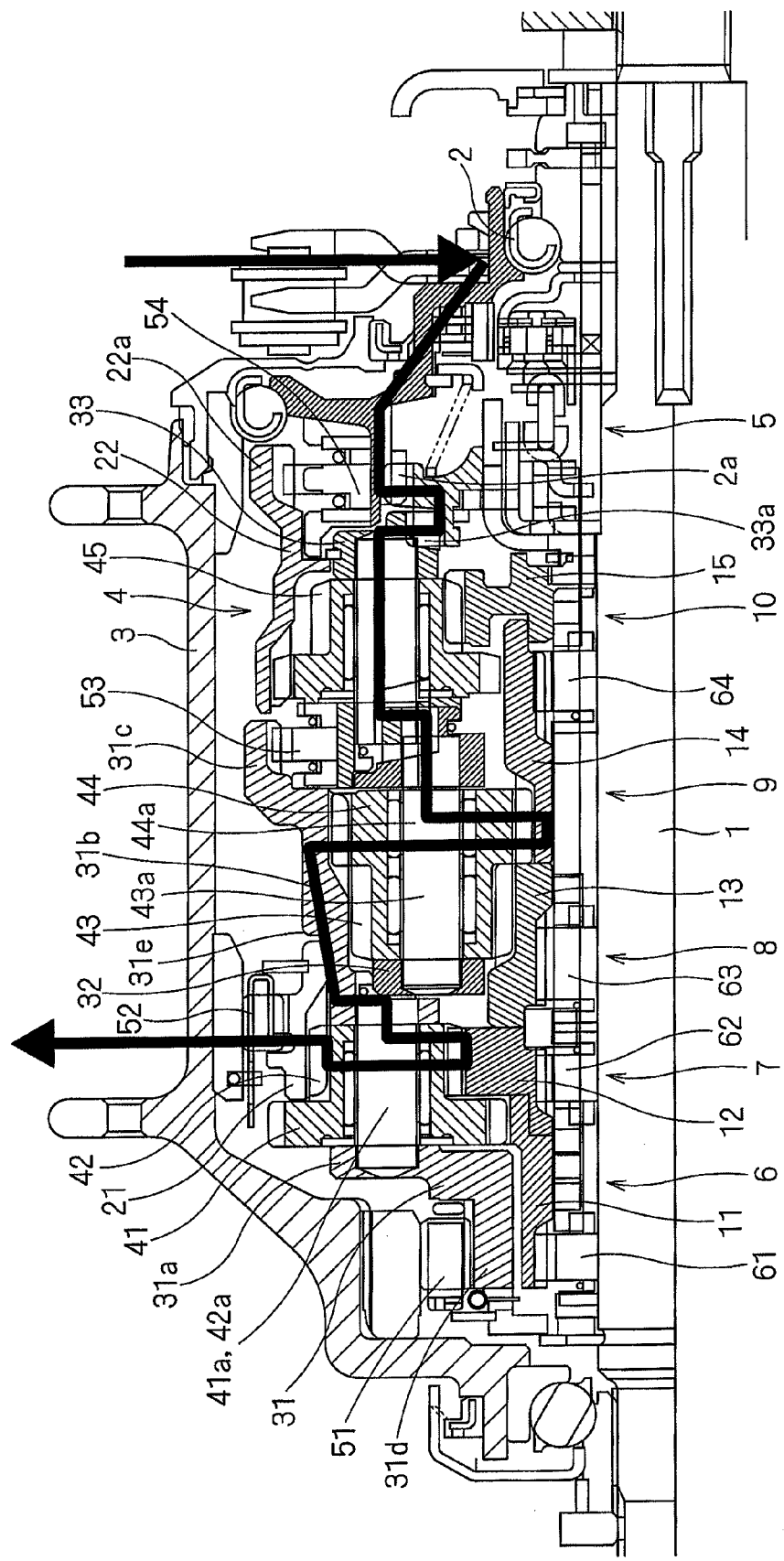
FIG. 15 is a longitudinal cross-sectional view of the hub transmission according to FIG. 1 in speed stage 14.
Figure 16:
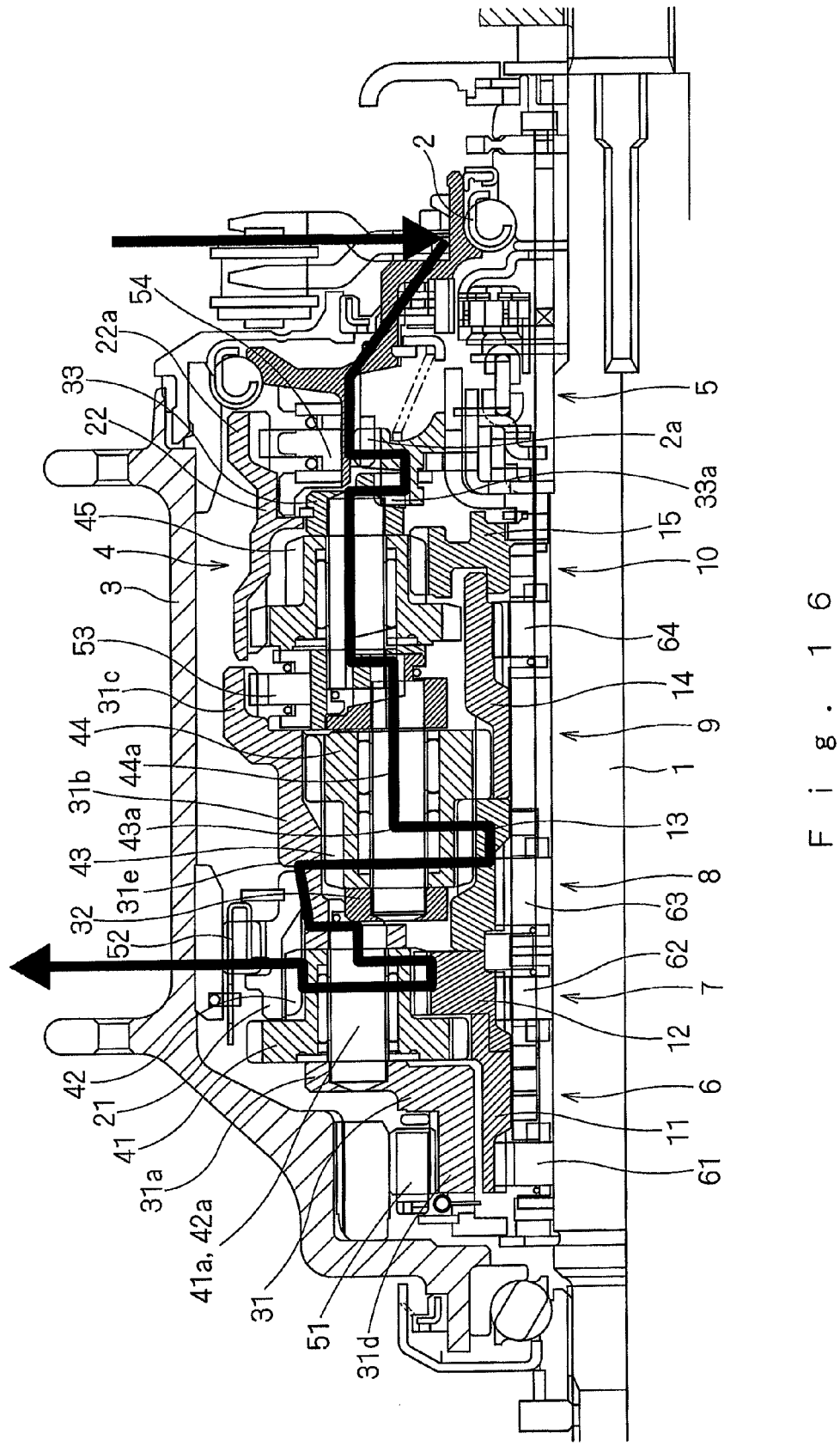
FIG. 16 is a longitudinal cross-sectional view of the hub transmission according to FIG. 1 in speed stage 15.

Referring initially to FIG. 1, a 15-speed bicycle hub transmission is illustrated in accordance with one preferred embodiment. The hub transmission is configured and arranged be mounted to the rear wheel of a bicycle. The hub transmission basically includes a hub axle 1 and a driver 2 which is rotatably supported by the hub axle 1. The hub transmission further includes a hub shell 3 which is rotatably supported by the hub axle 1. A power transmission mechanism 4 is disposed between the driver 2 and the hub shell 3 to selectively transmit rotational power from the driver 2 to the hub shell 3 through one of a plurality of power transmission paths that can be selected to change the gear ratio as desired by the rider.

To select one of the power transmission paths a shift mechanism 5 is provided. The shift mechanism 5 corresponds to the shift mechanism described in detail in European Patent No. EP 1 323 627 A2 and U.S. Pat. No. 6,607,465 B1 mentioned therein. The hub transmission has a plurality of planetary gear mechanisms 6, 7, 8, 9 and 10. The planetary gear mechanisms 6, 7, 8, 9 and 10 are arranged in series and form at least five planetary gear mechanisms in the illustrated embodiment. The higher the number of the planetary gear mechanism 6, 7, 8, 9 or 10, the closer it is arranged to the driver 2. For example, the second planetary gear mechanism 7 is closer to the driver 2 than the first planetary gear mechanism 6.

As mentioned above, the power transmission mechanism 4 has the planetary gear mechanisms 6, 7, 8, 9 and 10 including a downstream planetary gear unit and an upstream planetary gear unit with the upstream planetary gear unit being arranged closer to the driver 2 than the downstream planetary gear unit. As seen in the direction of the rotational power flow, the downstream planetary gear unit is arranged after the upstream planetary gear unit. For example, the downstream planetary gear unit includes the first and second planetary gear mechanisms 6 and 7 and the upstream planetary gear unit includes the third, fourth and fifth planetary gear mechanisms 8, 9 and 10. The first and second planetary gear mechanisms 6 and 7 (downstream planetary gear unit) can be coupled with the fourth planetary gear mechanism 9 (upstream planetary gear unit).

As is evident from FIG. 1, the downstream planetary gear unit has a planetary gear carrier 31, and the upstream planetary gear unit has planetary gears 44 with the planetary gear carrier 31 of the first and second planetary gear mechanisms 6 and 7 meshing with planetary gears 44 of the fourth planetary gear mechanism 9. The planetary gear carrier 31 is a common carrier for both the first and second planetary gear mechanisms 6 and 7.

In general, the planetary gear carrier 31 has a longitudinally extending shape that is adapted to overlap components of the power transmission mechanism 4 that are arranged upstream of the first and second planetary gear mechanisms 6 and 7 and, thus, more proximate to the driver 2 than the downstream planetary gear unit.

In particular, the planetary gear carrier 31 of the downstream planetary gear unit axially extends from the area of the first and second planetary gear mechanisms 6 and 7 to the area of the fourth planetary gear mechanism 9. As illustrated in FIG. 1, the planetary gear carrier 31 axially extends over more than ⅓ to ½ of the entire length of the hub transmission. The axial extension of the planetary gear carrier 31 is such that the third planetary gear mechanism 8 which is arranged between the second (downstream) planetary gear mechanism 7 and the fourth planetary gear mechanism 9 is overlapped by the planetary gear carrier 31. In the embodiment according to FIG. 1, the third planetary gear mechanism 8 is not engaged with the planetary gear carrier 31.

The planetary gear carrier 31 has a stepped shape with the inner diameter of the subsequent steps increasing towards the driver 2. The stepped shape of the planetary gear carrier 31 will be described in more detail in conjunction with the respective components associated thereto.

The planetary gear carrier 31 further includes a (first) clutch engaging portion 31c which is arranged on the axial end of the planetary gear carrier 31 proximate to the driver 2. The clutch engaging portion 31c is provided to engage with/disengage from the clutch 53 (third clutch) which will be described in more detail in connection with the fifth planetary gear mechanism 10.

The planetary gear carrier 31 further has a ring gear portion. The ring gear portion 31b is integrally connected with the clutch engaging portion 31c and is formed with a smaller inner diameter than a clutch engaging portion 31c. The ring gear portion 31b meshes with the planetary gears 44 of the upstream or fourth planetary gear mechanism 9. The inner diameter of the ring gear portion 31b is larger than the outer diameter of third planetary gears 43 of the third planetary gear mechanism 8, to avoid engagement or collision therewith.

The ring gear portion 31b is integrally connected with a carrier portion 31a which supports first planetary gears 41 of the first (downstream) planetary gear mechanism 6 and the second planetary gears 42 of the second (downstream) planetary gear mechanism 7. The first planetary gears 41 are rotatably supported by first planetary gear shafts 41a. The second planetary gears 42 are rotatably supported by the second planetary gear shafts 42a. The first and second planetary gear shafts 41a and 42a are disposed in the carrier portion 31a of the planetary gear carrier 31. Typically, three or more first planetary gears 41 are provided in the first planetary gear mechanism 6 and three or more second planetary gears 42 are provided in the second planetary gear mechanism 7.

A further (or second) clutch engaging portion 31d is integrally formed with the carrier portion 31a, and is provided for engaging with/disengaging from a first clutch 51 to establish/interrupt a power transmission from the planetary gear carrier 31 to the hub shell 3. A further (or second) clutch engaging portion 31d is arranged downstream of the first planetary gear mechanism 6. The ring gear portion 31b and the (first) clutch engaging portion 31c are located upstream of the planetary gear mechanism 6. Again, the downstream or upstream arrangement of components is seen and to be understood in the direction of the power flow.

The plurality of planetary gear mechanisms 6, 7, 8, 9 and 10 will be described in the following.

The first planetary gear mechanism 6 is arranged most downstream or most distant from the driver 2 with the first sun gear 11 being rotatably supported by the hub axle 1 and selectively lockable with the hub axle 1. Between an inner peripheral surface of the first sun gear 11 and the hub axle 1, the first sun gear guide ring 61 is non-rotatably fixed to the hub axle 1. The first sun gear guide ring 61 allows for the locking and unlocking of the first sun gear 11 by means of the shifting mechanism 5.

The first planetary gears 41 are rotatably supported by the first planetary gear carrier 31, in particular by the first planetary gear shafts 41a disposed in the first planetary gear carrier 31, and meshes with the first sun gear 11.

The second planetary gear mechanism 7 is arranged upstream of the first planetary gear mechanism 6 with the second sun gear 12 being rotatably supported by the hub axle 1 and selectively lockable with the hub axle 1.

As seen in FIG. 1, the first sun gear 11 and the second sun gear 12 (in general: the more than one or at least two sun gears) are arranged adjacent or next to each other. The first and second sun gears 11 and 12 (in general: the more than one or at least two sun gears) are selectively lockable with the hub axle 1. The first sun gear 11 and the second sun gear 12 form part of the downstream planetary gear unit which is coupled with the planetary gears 44 of the upstream planetary gear unit or fourth planetary gear mechanism 9, by the first planetary gear carrier 31.

As further seen in FIG. 1, the second sun gear 12 has an axial projection 12a which extends in a downstream axial direction. The axial projection 12a is arranged radially below the engaging portion of the first sun gear 11 which meshes with the first planetary gears 41. To this end, the sun gear 11 has a shoulder which accommodates the axial projection 12a of the second sun gear 12. Thereby, a compact and stable configuration of the first and second sun gears 11 and 12 is achieved.

The second planetary gear mechanism 7 further has the second planetary gears 42 which mesh with second sun gear 12. Coaxially arranged in relation to and rotatably supported by the hub axle 1, is a first ring gear 21 which meshes with second planetary gears 42 of the second planetary gear mechanism 7. Thus, the second planetary gears 42 are arranged in between the first ring gear 21 and the second sun gear 12. The second planetary gears 42 are supported by second planetary gear shafts 42a. The second planetary gear shafts 42a are disposed in the first planetary gear carrier 31.

The second planetary gear shaft 42a is integrally formed with the first planetary gear shaft 41a such that the first and second planetary gears 41 and 42 are supported by the same or a common shaft 41a or 42a.

As illustrated in FIG. 1, the first and second planetary gears 41 and 42 form two gear stages wherein the large diameter gear stage of the first planetary gear 41 meshes with the first sun gear 11 and the small diameter gear stage of the second planetary gear 42 meshes with the first ring gear 21. The small diameter gear stage of the second planetary gears 42 is arranged proximate to the third planetary gear mechanism 8. The first and second planetary gears 41 and 42 are non-rotatably coupled, in particular integrally formed.

Thereby, the first and second planetary gears 41 and 42 constitute a stepped or non-rotatably coupled planetary gear comprising two different diameters, which mesh with the first and second sun gears 11 and 12 (in general: with the at least two sun gears 11 and 12). The large diameter of the stepped planetary gear meshes with the first sun gear 11 and the small diameter of the stepped planetary gear meshes with the second sun gear 12 and the first ring gear 21.

The two sun gears 11 and 12 can be coupled by the first planetary gear carrier 31 with an upstream planetary gear unit, in particular with the fourth planetary gear mechanism 9.

The first ring gear 21 can be connected with or disconnected from the hub shell 3 by a second (one-way) clutch 52 which is disposed between the first ring gear 21 and the hub shell 3.

As described above, the ring gear carrier 31 of the first planetary gear mechanism 6 extends axially beyond the first and second planetary gears 41 and 42 in a longitudinal direction of the hub transmission thereby overlapping at least the subsequently arranged upstream third and fourth planetary gear mechanisms 8 and 9. The outer contour of first planetary gear carrier 31 is adapted to partially accommodate the first ring gear 21 and forms the shoulder 31e such that the first ring gear 21 is arranged between the shoulder 31e and the large diameter gear stage of the first planetary gears 41.

The third planetary gear mechanism 8 is located upstream of the second planetary gear mechanism 7 with the third sun gear 13 being rotatably supported by the hub axle 1 and selectively lockable with the hub axle 1. Between an inner surface of the second sun gear 13 and the hub axle 1, the third sun gear guide ring 63 is non-rotatably fixed to the hub axle 1. Several third planetary gears 43 are rotatably supported by a second planetary gear carrier 32 which is rotatably supported by the hub axle 1. To this end, the third planetary gears 43 are rotatably supported by the third planetary gear shafts 43a which are supported by the second planetary gear carrier 32. Typically three or more third planetary gears 43 are provided.

The fourth planetary gear mechanism 8 is arranged upstream of the third planetary gear mechanism 8 with the fourth sun gear 14 being rotatably supported by the hub axle 1 and selectively lockable with the hub axle 1. Between an inner peripheral surface of the fourth sun gear 13 and the hub axle 1, the fourth sun gear guide ring 64 is arranged and non-rotatably fixed to hub axle 1. The fourth sun gear guide ring 64 can be actuated by means of the shifting mechanism 5 to lock/unlock the fourth sun gear 14.

Several fourth planetary gears 44 mesh with the fourth sun gear 14, and is rotatably supported by the second planetary gear carrier 32. In particular, fourth planetary gears 44 are arranged on a fourth planetary gear shaft 44a which is integrally formed with the third planetary gear shaft 43a and, thus, represents a common planetary gear shaft for the third and fourth planetary gears 43 and 44.

As is evident from FIG. 1, the third and fourth planetary gears 43 and 44 are non-rotatably connected and integrally form a stepped planetary gear 402. The small diameter gear stage of the stepped planetary gear 402 (third planetary gears 43) meshes with the third sun gear 13, and the large diameter gear stage of the stepped planetary gear 402 (fourth planetary gears 44) meshes with the fourth sun gear 9. Moreover, the large diameter gear stage of the stepped planetary gear 402 (fourth planetary gears 44) meshes with the ring gear portion 31b of the downstream planetary gear carrier 31. Thus, it is possible to establish a transmission path connecting the fourth sun gear 9 with the first planetary gear carrier 31.

The fifth planetary gear mechanism 10 is arranged upstream of the fourth planetary gear mechanism 9 and represents the planetary gear mechanism closest to the driver 2. The fifth planetary gear mechanism 10 has the fifth sun gear 15 which is non-rotatably fixed to the hub axle 1. The second ring gear 22 is coaxially arranged with and rotatably supported by the hub axle 1. Between the second ring gear 22 and the fifth sun gear 15, the fifth planetary gears 45 are arranged which are formed as two-step planetary gears. The large diameter gear stage of the fifth planetary gears 45 meshes with the second ring gear 22, and the small diameter gear stage of the fifth planetary gears 45 meshes with the fifth sun gear 15. Typically three or more fifth planetary gears 45 are provided.

The fifth planetary gears 45 are rotatably supported by a third planetary gear carrier 33 which can rotate around the hub axle 1. The third planetary gear carrier 33 has the fifth planetary gear shafts 45a which rotatably support the fifth planetary gears 45. The third planetary gear carrier 33 is engaged with the second planetary gear carrier 32 to transmit power from the third planetary gear carrier 33 to the second planetary gear carrier 32.

As is readily apparent from FIG. 1, the middle axes of the third and fourth planetary gear shafts 43a and 44a and the middle axes of the fifth planetary gear shafts 45a are radially spaced apart. The middle axes of fifth planetary gear shafts 45a are arranged on a cylindrical plane having a larger diameter than a cylindrical plane which comprises the middle axes of the third and fourth planetary gear shafts 43a and 44a. The cylindrical plane which comprises the middle axes of first and second planetary gear shafts 41a and 42a corresponds to the cylindrical plane of the middle axes of the fifth planetary gear shafts 45a. Thus, the middle axes of the third and fourth planetary gear shafts 43a and 44a, which are arranged between the second and fifth planetary gear mechanisms 7 and 10, are closer to the hub axle 1 than the middle axes of the second and fifth planetary gear shafts 42a and 45a, respectively.

The third planetary gear carrier 33 of the fifth planetary gear mechanism 9 can be connected to the downstream planetary gear carrier 31. For this purpose, the third clutch 53 mentioned above is provided between the third planetary gear carrier 33 and the first planetary gear carrier 31. In particular, the third clutch 53 is arranged at an end of the third planetary gear carrier 33 distant from the driver 2 and engages with/disengages from the clutch engaging portion 31c of downstream of the first planetary gear carrier 31. For the power transmission from the driver 2 to the fifth planetary gear mechanism 9, the fourth and fifth clutches 54 and 55 are provided.

The fourth clutch 54 is a one-way clutch disposed between the driver 2 and the second ring gear 22. The second ring gear 22 comprises an axial projection 22a which extends towards the driver 2. The axial projection 22a comprises on its inner peripheral surface a clutch engaging portion 22b, which cooperates with the fourth clutch 54 to lock or unlock the second ring gear 22 with the driver 2. The fourth clutch 54 is supported by the axial projection 2a of the driver 2 that extends in parallel with the axial projection 22a of the ring gear 22.

For speed stages 1 to 6, the fourth clutch 54 is engaged with the ring gear 22 to transmit power from the driver 2 to the ring gear 22.

For speed stages 7 to 11, the fifth clutch 55 is provided which is disposed between the driver 2 and the third planetary gear carrier 33 for transmitting rotational power from the driver 2 to the third planetary gear driver 33. The fifth clutch 55 is formed as a clutch ring, and is axially movable in a longitudinal direction of the hub axle 1. The fifth clutch 55 has the two engaging portions 55a and 55b which are adapted to engage with the clutch engaging portions 2b and 33a which are provided on the driver 2 and the third planetary gear carrier 33, respectively.

The clutch engaging portion 2b of the driver 2 is formed on the inner peripheral surface of the axial projection 2a and engages with the upper or radial engaging portion 55b of the fifth clutch 55. The clutch engaging portion 33a of the third planetary gear carrier 33 is adapted to engage with/disengage from the lower or axial engaging portion 55a of the fifth clutch 55.

For speed stages 7 to 11, the axial engaging portion 55a of the fifth clutch 55 and the clutch engaging portion 33a of the third planetary gear carrier 33 are coupled and the fourth clutch 54 is uncoupled. A more detailed description of the aforementioned clutch mechanism including the fourth and fifth clutches 54 and 55 is disclosed in European Patent No. EP 1 323 627 A2 as well as in European Patent Application No. 07 001 076.4, both assigned to Shimano Inc.

The function of the hub transmission according to FIG. 1 is explained with reference to FIGS. 2 to 16 in which the coupling of the various components for each speed stage and the specific power transmission path realized thereby are illustrated. The bold lines and arrows indicated in FIGS. 2 to 16 illustrate the rotational power flow through the power transmission mechanism 4. The coupling of the various components as well as the power transmission paths are indicated in the following Tables 1 and 2 wherein Table 1 concerns the coupling of the components and Table 2 concerns the specific power transmission path.

TABLE 1

| Speed Stage | Clutch ring 55 (Driver and 3rd Planetary gear carrier 33) | First Sun gear 11 | Second Sun gear 12 | Third Sun gear 13 | Fourth Sun gear 14 |
| --- | --- | --- | --- | --- | --- |
| 1 | Disengaged | Free | Free | Free | Free |
| 2 | Disengaged | Locked | Free | Free | Free |
| 3 | Disengaged | Free | Free | Free | Locked |
| 4 | Disengaged | Free | Free | Locked | Free |
| 5 | Disengaged | Locked | Free | Free | Locked |
| 6 | Disengaged | Locked | Free | Locked | Free |
| 7 | Disengaged | Free | Locked | Free | Locked |
| 8 | Disengaged | Free | Locked | Locked | Free |
| 9 | Disengaged | Locked | Free | Free | Free |
| 10 | Disengaged | Free | Free | Free | Locked |
| 11 | Disengaged | Free | Free | Locked | Free |
| 12 | Disengaged | Locked | Free | Free | Locked |
| 13 | Disengaged | Locked | Free | Locked | Free |
| 14 | Disengaged | Free | Locked | Free | Locked |
| 15 | Disengaged | Free | Locked | Locked | Free |

TABLE 2

| Speed Stage | Power Transmission Path | Gear Ratio |
| --- | --- | --- |
| 1 | Driver - 4th clutch 54 - 2nd ring gear 22 - (5th planet gear 45 rotates around 5th sun gear 15) - 3rd planetary gear carrier 33- 3rd clutch 53 - 1st planetary carrier 31 - 1st clutch 51 - Hub Shell | 0.426 |
| 2 | Driver - 4th clutch 54 - 2nd ring gear 22 - (5th planet gear 45 rotates around 5th sun gear 15) - 3rd planetary gear carrier 33 - 3rd clutch 53 - 1st planetary carrier 31 - (1st planet gear 41 rotates around 1st sun gear 11) - 1st ring gear 21 - 2nd clutch 52 - Hub Shell | 0.545 |
| 3 | Driver - 4th clutch 54 - 2nd ring gear 22 - (5th planet gear 45 rotates around 5th sun gear 15) - 3rd planetary gear carrier 33- 2nd planetary gear carrier 32 - (4th planet gear 44 rotates around 4th sun gear 14) - 1st planetary gear carrier 31 - 1st clutch 51 - Hub Shell | 0.612 |
| 4 | Driver - 4th clutch 54 - 2nd ring gear 22 - (5th planet gear 45 rotates around 5th sun gear 15) - 3rd planetary gear carrier 33 - 2nd planetary gear carrier 32 - (3rd planet gear 43 rotates around 3rd sun gear 13) - 1st planetary gear carrier 31 - 1st clutch 51 - Hub Shell | 0.694 |

TABLE 2-continued

| Speed Stage | Power Transmission Path | Gear Ratio |
|---|---|---|
| 5 | Driver - 4th clutch 54 - 2nd ring gear 22 - (5th planet gear 45 rotates around 5th sun gear 15) - 3rd planetary gear carrier 33 - 2nd planetary gear carrier 32 - (4th planet gear 44 rotates around 4th sun gear 14) - 1st planetary carrier 31 - (1st planet gear 41 rotates around 1st sun gear 11) - 1st ring gear 21 - 2nd clutch 52 - Hub Shell | 0.782 |
| 6 | Driver - 4th clutch 54 - 2nd ring gear 22 - (5th planet gear 45 rotates around 5th sun gear 15) - 3rd planetary gear carrier 33 - 2nd planetary gear carrier 32 - (3rd planet gear 43 rotates around 3rd sun gear 13) - 1st planetary carrier 31 - (1st planet gear 41 rotates around 1st sun gear 11) - 1st ring gear 21 - 2nd clutch 52 - Hub Shell | 0.887 |
| 7 | Driver - 4th clutch 54 - 2nd ring gear 22 - (5th planet gear 45 rotates around 5th sun gear 15) - 3rd planetary gear carrier 33 - 2nd planetary gear carrier 32 - (4th planet gear 44 rotates around 4th sun gear 14) - 1st planetary carrier 31 - (2nd planet gear 42 rotates around 2nd sun gear 12) - 1st ring gear 21 - 2nd clutch 52 - Hub Shell | 0.997 |
| 8 | Driver - 4th clutch 64 - 2nd ring gear 22 - (5th planet gear 45 rotates around 5th sun gear 15) - 3rd planetary gear carrier 33 - 2nd planetary gear carrier 32 - (3rd planet gear 43 rotates around 3rd sun gear 13) - 1st planetary carrier 31 - (2nd planet gear 42 rotates around 2nd sun gear 12) - 1st ring gear 21 - 2nd clutch 52 - Hub Shell | 1.130 |
| 9 | Driver - 5th clutch 55 - 3rd planetary gear carrier 33 - 3rd clutch 53 - 1st planetary carrier 31 - (1st planet gear 41 rotates around 1st sun gear 11) - 1st ring gear 21 - 2nd clutch 52 - Hub Shell | 1.279 |
| 10 | Driver - 5th clutch 55 - 3rd planetary gear carrier 33 - 2nd planetary gear carrier 32 - (4th planet gear 44 rotates around 4th sun gear 14) - 1st planetary gear carrier 31 - 1st clutch 51 - Hub Shell | 1.437 |
| 11 | Driver - 5th clutch 55 - 3rd planetary gear carrier 33 - 2nd planetary gear carrier 32 - (3rd planet gear 43 rotates around 3rd sun gear 13) - 1st planetary gear carrier 31 - 1st clutch 51 - Hub Shell | 1.630 |
| 12 | Driver - 5th clutch 55 - 3rd planetary gear carrier 33 - 2nd planetary gear carrier 32 - (4th planet gear 44 rotates around 4th sun gear 14) - 1st planetary carrier 31 - (1st planet gear 41 rotates around 1st sun gear 11) - list ring gear 21 - 2nd clutch 52 - Hub Shell | 1.838 |
| 13 | Driver - 5th clutch 55 - 3rd planetary gear carrier 33 - 2nd planetary gear carrier 32 - (3rd planet gear 43 rotates around 3rd sun gear 13) - 1st planetary carrier 31 - (1st planet gear 41 rotates around 1st sun gear 11) - 1st ring gear 21 - 2nd clutch 52 - Hub Shell | 2.085 |
| 14 | Driver - 5th clutch 55 - 3rd planetary gear carrier 33 - 2nd planetary gear carrier 32 - (4th planet gear 44 rotates around 4th sun gear 14) - list planetary carrier 31 - (2nd planet gear 42 rotates around 2nd sun gear 12) - 1st ring gear 21 - 2nd clutch 52 - Hub Shell | 2.341 |
| 15 | Driver - 5th clutch 55 - 3rd planetary gear carrier 33 - 2nd planetary gear carrier 32 - (3rd planet gear 43 rotates around 3rd sun gear 13) - 1st planetary carrier 31 - (2nd planet gear 42 rotates around 2nd sun gear 11) - 1st ring gear 21 - 2nd clutch 52 - Hub Shell | 2.656 |

In summary, the hub transmission according to the described embodiment of the invention allows the realization of an 11 speed internal hub transmission wherein the diameter of the hub shell 2 is similar to the diameter of a currently available 8 speed hub transmission. This means that the hub transmission of the invention provides more speed stages than the conventional hub transmission without increasing the hub diameter. Moreover, the hub transmission according to FIG. 1 provides the advantage that all transmission paths are simple which leads to an efficient power transmission.

In general, the planetary gear carrier 31 of the downstream planetary gear mechanism 6 has an axially elongated shape adapted to mesh with the planetary gears 43 of the upstream planetary gear mechanism 8. Moreover, the axially elongated shape of the planetary gear carrier 31 allows for coupling/uncoupling the planetary gear carrier 31 with/from a planetary gear carrier 33 of a further upstream planetary gear mechanism 9. In particular, the axially elongated planetary gear carrier 31 of the downstream planetary gear mechanism 6 is adapted to selectively transmit rotational power from the planetary gears 43 of the upstream planetary gear mechanism 8 and to selectively transmit rotational power from the planetary gear carrier 33 of the further upstream planetary gear mechanism 9.

The axially elongated shape of the downstream planetary gear carrier 31 allows for a compact, small diameter internal hub transmission for a bicycle with highly efficient transmission paths.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub transmission comprising:
    a hub axle;
    a driver rotatably supported relative to the hub axle;
    a hub shell rotatably supported relative to the driver,
    a power transmission mechanism including a downstream planetary gear unit and an upstream planetary gear unit, which are operatively disposed between the driver and the hub shell to selectively transmit rotational power from the driver to the hub shell through one of a plurality of power transmission paths; and
    a shift mechanism operatively coupled to the power transmission mechanism to select one of the power transmission paths,
    the downstream planetary gear unit including at least a first sun gear, a second sun gear and a planetary gear carrier that meshes with planetary gears of the upstream planetary gear unit.

2. The bicycle hub transmission according to claim 1, wherein
    the downstream planetary gear unit and the upstream planetary gear unit form at least five planetary gear mechanisms arranged in series.

3. The bicycle hub transmission according to claim 1, wherein
    the downstream planetary gear unit constitutes at least first and second planetary gear mechanisms and the upstream planetary gear unit constitutes at least third, fourth and fifth planetary gear mechanisms.

4. The bicycle hub transmission according to claim 3, wherein
    the first and second planetary gear mechanisms include the planetary gear carrier of the downstream planetary gear unit as a common carrier and the fourth gear mechanism includes the planetary gears of the upstream planetary gear unit.

5. The bicycle hub transmission according to claim 3, wherein
    the planetary gear carrier of the downstream planetary gear unit is selectively connectable with the fifth planetary gear mechanism.

6. The bicycle hub transmission according to claim 5, wherein
    the planetary gear carrier of the downstream planetary gear unit includes a clutch engaging portion which is selectively connectable with a planetary gear carrier of the fifth planetary gear mechanism.

7. The bicycle hub transmission according to claim 3, wherein
    the second planetary gear mechanism includes the second sun gear, a first ring gear and a plurality of second planetary gears, with the second sun gear being rotatably supported by the hub axle and selectively lockable with the hub axle, the first ring gear being rotatably supported by the planetary gear carrier of the downstream planetary gear unit and being coaxially arranged with the second sun gear, and the second planetary gears meshing with the second sun gear and the first ring gear, the first and second planetary gears being non-rotatably connected as a unit to form stepped planetary gears respectively.

8. The bicycle hub transmission according to claim 7, wherein
    the first ring gear is selectively connectable with the hub shell by a second clutch for transmitting a rotational force from the first ring gear to the hub shell.

9. The bicycle hub transmission according to claim 8, wherein
    the third planetary gear mechanism includes a third sun gear, a second planetary gear carrier and a plurality of third planetary gears, with the third sun gear being rotatably supported by the hub axle and selectively lockable with the hub axle, the second planetary gear carrier being rotatably supported relative to the hub axle and the third planetary gears rotatably being supported by the second planetary gear carrier and meshing with the third sun gear.

10. The bicycle hub transmission according to claim 9, wherein
    the fourth planetary gear mechanism includes a fourth sun gear rotatably supported by the hub axle and selectively lockable with the hub axle, with the planetary gears of the fourth planetary gear mechanism being rotatably supported by the second planetary gear carrier and meshing with the fourth sun gear.

11. The bicycle hub transmission according to claim 10, wherein
    the planetary gears of the fourth planetary gear mechanism and the third planetary gears of the third planetary gear mechanism are non-rotatably connected as a unit to form stepped planetary gears respectively.

12. The bicycle hub transmission according to claim 11, wherein
    the fifth planetary gear mechanism includes a fifth sun gear, a second ring gear and a plurality of fifth planetary gears, with the fifth sun gear being non-rotatably fixed to the hub axle, the second ring gear being coaxially arranged with the fifth sun gear, and the fifth planetary gears being rotatably supported by a third planetary gear carrier and meshing with the fifth sun gear and the second ring gear.

13. The bicycle hub transmission according to claim 12, wherein
    the third planetary gear carrier engages with the second planetary gear carrier.

14. The bicycle hub transmission according to claim 12, further comprising
    a third clutch disposed between the third planetary gear carrier and the first planetary gear carrier, with a clutch engaging portion arranged to selectively transmit a rotational force from the third planetary gear carrier to the first planetary gear carrier.

15. The bicycle hub transmission according to claim 14, further comprising
 a fourth clutch is disposed between the driver and the second ring gear to selectively transmit a rotational force from the driver to the second ring gear.

16. The bicycle hub transmission according to claim 15, further comprising
 a fifth clutch is disposed between the driver and the third planetary gear carrier to selectively transmit a rotational force from the driver to the third planetary gear carrier.

17. The bicycle hub transmission according to claim 1, wherein
 the planetary gear carrier of the downstream planetary gear unit includes a carrier portion and a ring gear portion which meshes with the planetary gears of the upstream planetary gear unit, with the carrier portion and the ring gear portion being non-rotatably connected as a unit.

18. The bicycle hub transmission according to claim 1, wherein
 the planetary gear carrier of the downstream planetary gear unit is selectively connectable with the hub shell by a first clutch to transmit a rotational force from the planetary gear carrier to the hub shell.

19. The bicycle hub transmission according to claim 18, further comprising a
 first planetary gear mechanism includes the first sun gear and a plurality of first planetary gears, with the first sun gear being rotatably supported by the hub axle and selectively lockable with the hub axle, and the first planetary gears being rotatably supported by the planetary gear carrier of the downstream planetary gear unit and meshing with the first sun gear.

\* \* \* \* \*